United States Patent [19] [11] Patent Number: 5,131,054
Smith [45] Date of Patent: Jul. 14, 1992

[54] CHARACTER RECOGNITION SYSTEM USING MASSIVELY PARALLEL COMPUTER THAT IDENTIFIES A QUERY CHARACTER USING DEGREE OF SIMILARITY WITH PLURALITY OF TRAINING CHARACTERS OF KNOWN IDENTITY

[75] Inventor: Stephen J. Smith, Lynnfield, Mass.

[73] Assignee: Thinking Machines Corporation, Cambridge, Mass.

[21] Appl. No.: 639,490

[22] Filed: Jan. 9, 1991

[51] Int. Cl.[5] .............................................. G06K 9/56
[52] U.S. Cl. ........................................ 382/27; 382/30; 382/34
[58] Field of Search ........................ 382/34, 30, 27, 20, 382/23

[56] References Cited

U.S. PATENT DOCUMENTS

| | | | |
|---|---|---|---|
| 3,339,179 | 8/1967 | Shelton, Jr. et al. | 340/146.3 |
| 4,415,880 | 11/1983 | Scott | 382/27 |
| 4,598,400 | 7/1986 | Hillis | 370/60 |
| 4,773,038 | 9/1988 | Hillis et al. | 364/900 |
| 4,814,973 | 3/1989 | Hillis | 364/200 |
| 4,827,403 | 5/1989 | Steele, Jr. et al. | 364/200 |
| 4,833,721 | 5/1989 | Okutomi et al. | 382/21 |
| 4,896,363 | 1/1990 | Taylor et al. | 382/5 |
| 4,984,235 | 1/1991 | Hillis et al. | 370/60 |

Primary Examiner—Leo H. Boudreau
Assistant Examiner—Andrew W. Johns
Attorney, Agent, or Firm—Richard A. Jordan

[57] ABSTRACT

A character recognition system for recognizing a character associated with a query character. The query character has a query character image defined by a query character image array having a pattern of array elements defining on pixels and off pixels for said query character image, in response to training character images also represented by patterns of on and off pixels. The system generates, for each image array, a distance array having a pattern of array elements each identifying a distance value to pixels of selected conditions, thereby identifying distances to artifacts in the respective images. In addition, the system generates distance scores for both the query character and the training character, using the distance arrays, representing the consolidated deviation between the query character image and the training character images. The system includes a massively-parallel processor including a plurality of processing elements to process the training character image arrays in parallel.

54 Claims, 15 Drawing Sheets

20 GENERATE, FOR EACH TRAINING IMAGE, A TRAINING ON DISTANCE ARRAY TO IDENTIFY FOR EACH PIXEL THE DISTRANCE FROM THE PIXEL TO NEAREST ON PIXEL, AND A TRAINING OFF DISTANCE ARRAY TO IDENTIFY FOR EACH PIXEL THE DISTANCE FROM THE PIXEL TO NEAREST OFF PIXEL

↓

21 GENERATE, FOR EACH TRAINING IMAGE, AN ON/OFF DEVIATION SCORE USING THE TRAINING ON AND OFF DISTANCE ARRAYS AND THE QUERY IMAGE DATA

↓

22 GENERATE, FOR QUERY IMAGE, A QUERY ON DISTANCE ARRAY AND A QUERY OFF DISTANCE ARRAY

↓

23 UPDATE, FOR EACH TRAINING IMAGE, ON/OFF DEVIATION SCORE USING THE QUERY ON AND OFF DISTANCE ARRAYS AND THE DATA FOR THE TRAINING IMAGES

↓

24 IDENTIFY TRAINING IMAGE ASSOCIATED WITH THE MINIMUM ON/OFF DEVIATION SCORE

FIGURE 2

20 GENERATE, FOR EACH TRAINING IMAGE, A TRAINING ON DISTANCE ARRAY TO IDENTIFY FOR EACH PIXEL THE DISTRANCE FROM THE PIXEL TO NEAREST ON PIXEL, AND A TRAINING OFF DISTANCE ARRAY TO IDENTIFY FOR EACH PIXEL THE DISTANCE FROM THE PIXEL TO NEAREST OFF PIXEL

21 GENERATE, FOR EACH TRAINING IMAGE, AN ON/OFF DEVIATION SCORE USING THE TRAINING ON AND OFF DISTANCE ARRAYS AND THE QUERY IMAGE DATA

22 GENERATE, FOR QUERY IMAGE, A QUERY ON DISTANCE ARRAY AND A QUERY OFF DISTANCE ARRAY

23 UPDATE, FOR EACH TRAINING IMAGE, ON/OFF DEVIATION SCORE USING THE QUERY ON AND OFF DISTANCE ARRAYS AND THE DATA FOR THE TRAINING IMAGES

24 IDENTIFY TRAINING IMAGE ASSOCIATED WITH THE MINIMUM ON/OFF DEVIATION SCORE

FIGURE 4A

GENERATION OF TRAINING ON

AND OFF DISTANCE ARRAYS

50 ESTABLISH A COLUMN PIXEL POINTER AND A ROW PIXEL POINTER TO IDENTIFY COLUMN AND ROW COORDINATES OF TEST PIXEL IN TRAINING IMAGE ARRAYS

51 ESTABLISH A COLUMN PIXEL COUNTER AND A ROW PIXEL COUNTER TO IDENTIFY COLUMN AND ROW COORDINATES OF OTHER PIXELS

52 ENABLE PE'S TO ESTABLISH AN ON MIN TEMP REG AND AN OFF MIN TEMP REG AND LOAD INITIALIZATION VALUES (INFINITY) INTO THEM

53 ENABLE PE'S TO ESTABLISH A TRAINING ON DISTANCE ARRAY AND A TRAINING OFF DISTANCE ARRAY

54 ENABLE PE'S TO ESTABLISH AN ON/OFF CONTEXT FLAG

55 ENABLE PE'S TO ESTABLISH A TRAINING IMAGE ARRAY AND LOAD TRAINING IMAGE DATA THEREIN

56 GENERATE A VALUE CORRESPONDING TO THE SQUARE OF DIFFERENCE BETWEEN COLUMN PIXEL POINTER AND COLUMN PIXEL COUNTER, AND STORE IN A TEMP BUFFER

|
V

57 GENERATE A VALUE COORESPONDING TO SQUARE OF DIFFERENCE BETWEEN ROW PIXEL POINTER AND ROW PIXEL COUNTER AND ADD TO VALUE IN TEMP BUFFER

|
V

60 GENERATE DISTANCE VALUE CORRESPONDING TO SQUARE ROOT OF VALUE IN TEMP BUFFER, STORE IN TEMP BUFFER

|
V

61 ENABLE PE'S TO COPY TRAINING IMAGE PIXEL DATA FOR PIXEL IDENTIFIED BY COLUMN AND ROW PIXEL COUNTERS INTO ON/OFF CONTEXT FLAG

|
V

62 ENABLE PE'S WHOSE ON/OFF CONTEXT FLAGS ARE SET TO LOAD THE LESSER OF THE VALUE IN THE ON MIN TEMP REG AND THE DISTANCE VALUE INTO THE ON MIN TEMP REG

|
V
B
(Fig. 4C)

FIGURE 5A

QUERY/TRAINING DISTANCE
VALUE GENERATION

90 ESTABLISH A COLUMN PIXEL POINTER AND A ROW PIXEL POINTER TO ITERATIVELY IDENTIFY PIXELS OF QUERY IMAGE

91 ENABLE PE'S TO ESTABLISH AN ON/OFF DEVIATION SCORE BUFFER

92 IDENTIFY PIXEL OF QUERY IMAGE POINTED TO BY COLUMN AND ROW PIXEL POINTERS AND DETERMINE WHETHER IT IS IN ON OR OFF CONDITION

93 ENABLE PE'S TO RETRIEVE CONTENTS OF TRAINING ON OR OFF DISTANCE ARRAY, CORRESPONDING TO CONDITION OF IDENTIFIED QUERY IMAGE PIXEL, FROM LOCATION IDENTIFIED BY COLUMN PIXEL POINTER AND ROW PIXEL POINTER

94 ENABLE PE'S TO ADD RETRIEVED VALUE TO CONTENTS OF THEIR ON/OFF DEVIATION SCORE BUFFERS

95 INCREMENT COLUMN PIXEL POINTER

96 IS VALUE OF COLUMN PIXEL POINTER GREATER THAN NUMBER OF COLUMNS IN QUERY IMAGE?  NO

YES

GENERATION OF QUERY ON

AND OFF DISTANCE ARRAYS

110 ESTABLISH A COLUMN PIXEL POINTER AND A ROW PIXEL POINTER TO IDENTIFY COLUMN AND ROW COORDINATES OF PIXEL IN QUERY IMAGE ARRAY

↓

111 ESTABLISH A COLUMN PIXEL COUNTER AND A ROW PIXEL COUNTER TO IDENTIFY COLUMN AND ROW COORDINATES OF TEST PIXEL

↓

112 ENABLE PE'S TO ESTABLISH AN ON MIN TEMP REG AND AN OFF MIN TEMP REG AND LOAD INITIALIZATION VALUES (INFINITY) INTO THEM

↓

113 ENABLE PE'S TO ESTABLISH A QUERY ON DISTANCE ARRAY AND A QUERY OF DISTANCE ARRAY

↓

114 ENABLE PE'S TO ESTABLISH AN ON/OFF CONTEXT FLAG

↓

115 ENABLE PE'S TO ESTABLISH A CUERY IMAGE ARRAY AND LOAD QUERY IMAGE DATA THEREIN

116 GENERATE A VALUE CORRESPONDING TO THE SQUARE OF THE DIFFERENCE BETWEEN THE COLUMN PIXEL POINTER AND THE COLUMN PIXEL COUNTER, AND STORE IN A TEMP BUFFER

117 GENERATE A VALUE CORRESPONDING TO THE SQUARE OF THE DIFFERENCE BETWEEN THE ROW PIXEL POINTER AND THE ROW PIXEL COUNTER, AND ADD TO RESULT IN TEMP BUFFER

120 GENERATE A DISTANCE VALUE CORRESPONDING TO THE SQUARE ROOT OF THE VALUE IN THE TEMP BUFFER, STORE RESULT IN TEMP BUFFER

121 ENABLE PE'S TO COPY QUERY IMAGE PIXEL DATA FOR PIXEL IDENTIFIED BY COLUMN AND ROW PIXEL COUNTERS INTO ON/OFF CONTEXT FLAG

122 ENABLE PE'S WHOSE ON/OFF CONTEXT FLAGS ARE SET TO LOAD THE LESSER OF THE VALUE IN THE ON MIN TEMP REG AND THE DISTANCE VALUE INTO THE ON MIN TEMP REG

TRAINING/QUERY DISTANCE VALUE GENERATION

150 ESTABLISH A COLUMN PIXEL POINTER AND A ROW PIXEL POINTER TO ITERATIVELY IDENTIFY PIXELS OF TRAINING IMAGES

151 ENABLE PE'S TO COPY TRAINING IMAGE PIXEL DATA OF TRAINING IMAGE PIXEL POINTED TO BY COLUMN AND ROW PIXEL POINTERS INTO ON/OFF CONTEXT FLAG

152 ENABLE PE'S WHOSE ON/OFF CONTEXT FLAGS ARE SET TO RETRIEVE CONTENTS OF QUERY ON DISTANCE ARRAY FROM LOCATION IDENTIFIED BY COLUMN PIXEL POINTER AND ROW PIXEL POINTER AND ADD RETRIEVED VALUE TO CONTENTS OF THEIR ON/OFF DEVIATION SCORE BUFFERS

153 ENABLE PE'S WHOSE ON/OFF CONTEXT FLAGS ARE SET TO RETRIEVE CONTENTS OF QUERY OFF DISTANCE ARRAY FROM LOCATION IDENTIFIED BY COLUMN PIXEL POINTER AND ROW PIXEL POINTER AND ADD RETRIEVED VALUE TO CONTENTS OF THEIR ON/OFF DEVIATION SCORE BUFFERS

A
(Fig. 7B)

CHARACTER RECOGNITION SYSTEM USING MASSIVELY PARALLEL COMPUTER THAT IDENTIFIES A QUERY CHARACTER USING DEGREE OF SIMILARITY WITH PLURALITY OF TRAINING CHARACTERS OF KNOWN IDENTITY

INCORPORATION BY REFERENCE

U.S. Pat. No. 4,598,400, issued Jul. 1, 1986, to W. Daniel Hillis, for Method and Apparatus For Routing Message Packets, and assigned to the assignee of the present application, incorporated herein by reference.

U.S. Pat. No. 4,814,973, issued Mar. 21, 1989, to W. Daniel Hillis, for Parallel Processor, and assigned to the assignee of the present application, incorporated herein by reference.

U.S. Pat. application Ser. No. 07/043,126, filed Apr. 27, 1987, by W. Daniel Hillis, et al, for Method and Apparatus For Routing Message Packets, and assigned to the assignee of the present application, incorporated herein by reference.

1. Field of the Invention

The invention relates generally to the field of digital computers, and more particularly to character recognition systems incorporating digital computers. In one embodiment, the invention provides a character recognition system in which processing is performed in a massively parallel computer system.

2. Background of the Invention

In addition to performing extensive and repetitive computations and managing large amounts of data, digital computers are used in image processing, and, in particular, character recognition. In character recognition, the image of the character to be recognized, the "query character," is scanned and the data generated during the scan, identified as query character image data, is processed to identify the query character. Typically, processing involves extracting various features of the query character image and using them to identify the character.

Generally, character recognition systems provide acceptable recognition capability for printed or typed characters, since the characters of the same font and typeface are uniform and the amount of processing involved is manageable. However, the number of fonts and typefaces that a particular character recognition system can recognize is typically fairly small. In addition, character recognition systems generally have substantial difficulty in recognizing hand-written characters. As a result of the limited ability of character recognition systems to recognize hand-written characters, agencies such as the Post Office, which would find the use of automated recognition of such address elements as ZIP codes helpful, have found such systems to be of limited use.

SUMMARY OF THE INVENTION

The invention provides a new and improved character recognition system that has substantially improved recognition capability, particularly of non-uniform and handwritten characters.

In brief summary, the character recognition system identifies a query character using a measure of the similarity between it and a plurality of training characters of known identity. In determining the similarity between the query character and each training character, the system determines a distance value representing the distance between light and dark portions of the query character and corresponding light and dark portions of the training character for each of a plurality of elements of the query character, and determines a deviation score representative of cumulative distance values. The system uses the deviation scores for all of the training characters to identify the query character.

In a refinement, the system further determines the deviation score in response to distance values representing the distance between light and dark portions of each training character and corresponding portions of the query character.

As a further refinement, the system includes a massively parallel computer including a plurality of processing elements which perform the described operations in connection with the diverse training characters in parallel.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 is a flow diagram generally depicting the operations performed in connection with the new character recognition system constructed in accordance with the invention;

FIGS. 4A through 7B are detailed flow diagrams describing the detailed operations performed by the character recognition system.

DETAILED DESCRIPTION OF AN ILLUSTRATIVE EMBODIMENT

Figure 1:
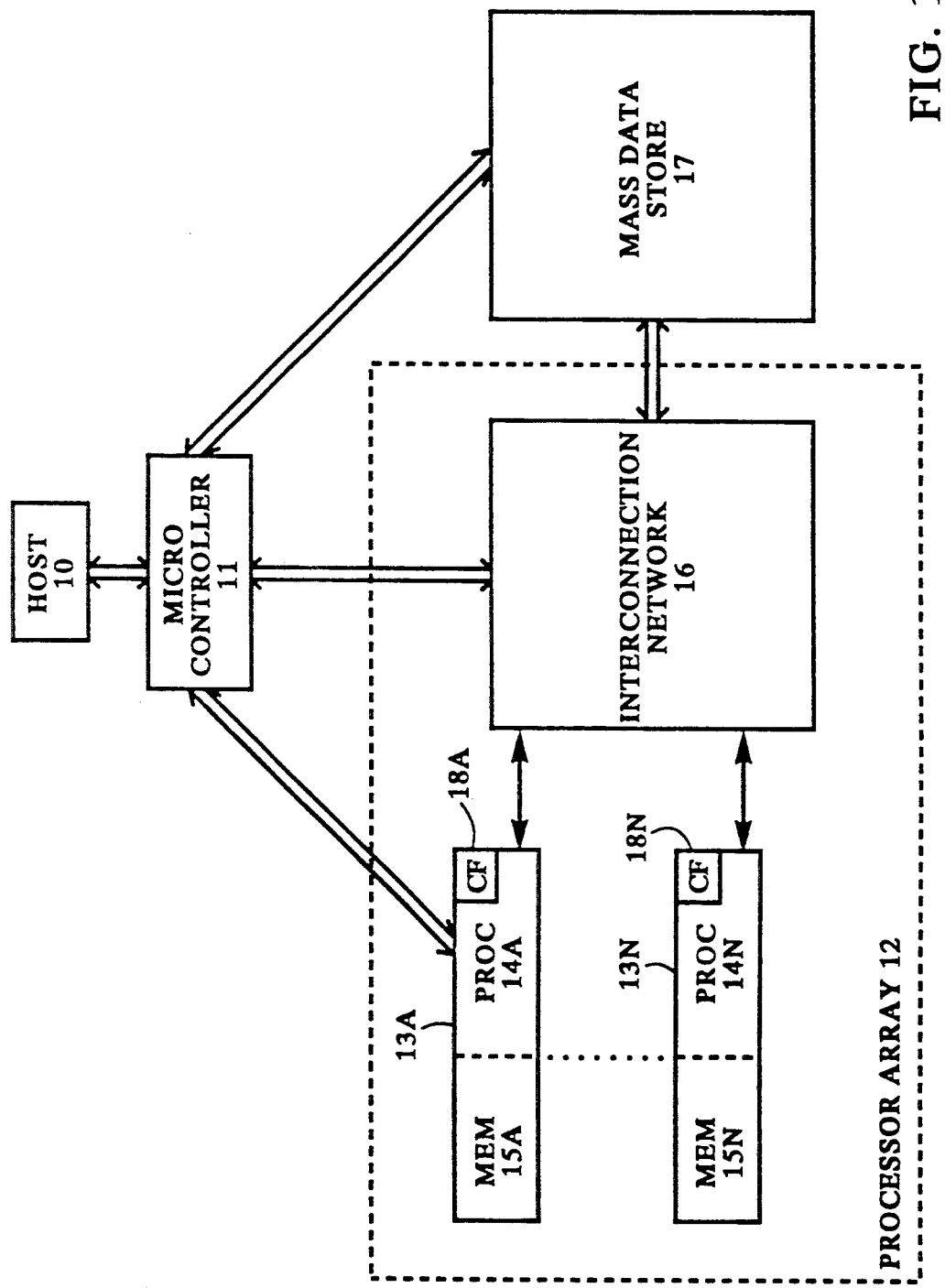
FIG. 1 is a functional block diagram of a massively parallel computer in which the invention can be implemented.

A character recognition system constructed in accordance with the invention can incorporate a massively parallel computer having a functional organization such as depicted in the aforementioned Hillis patents and Hillis, et al., patent application. Such a computer is generally depicted in the block diagram of FIG. 1. With reference to FIG. 1, the massively parallel computer includes a host 10 which transmits commands to a micro-controller 11 to control processing by a processor array 12. The processor array 12 includes a number of processing elements 13A through 13N [generally identified by reference numeral 13($i$)], each including a processor 14($i$) and a memory 15($i$).

The micro-controller 11 transmits control signals that enable the processors 14($i$) to, in parallel, process items of data in their respective memories 15($i$). In one embodiment, the addresses of locations in the memories 15($i$) to be processed by the processors 14($i$) can be selectively provided either by the micro-controller 11, or they may be generated and maintained locally at each of the processors 14($i$). The control signals provided by the micro-controller 11 enable the processors 14($i$) to use either the locally-generated addresses or addresses provided by it in identifying locations containing data to be processed.

In addition, processing by particular ones of the processors 14($i$) can be conditioned on results of previous processing. In particular, each processor 14($i$) includes a context flag 18A through 18N [generally identified by reference numeral 18(*i*)] that the processor 14(*i*) can, when enabled by the micro-controller 11, set or clear in response to its processing. The micro-controller 11 can condition processing by each of the processors 14(*i*) in response to the condition of the respective context flag 18(*i*).

The processor array 12 also includes an interconnection network 16 which, under control of the micro-controller 11, transfers data among the processing elements 13(*i*) and between the processing elements 13(*i*) and a mass data store 17. In one embodiment, the mass data store 17 generally stores data from the processing elements 13(*i*) organized in rows. That is, the mass data store 17 stores, in a group of successive storage locations, an item from all processors 14(*i*), with successive groups storing differing items. In that embodiment, a unit of storage in the mass data store 17 effectively comprises a group of storage locations in the mass data store 17, so that the mass data store 17 transfers an integral number of items to the processing elements 14(*i*) in one transfer operation. It will be appreciated that the data in other embodiments of the mass data store 17 may be organized in a number of ways, and that a character recognition system in accordance with the invention may be implemented in a massively parallel computer which does not include a mass data store 17.

With this background, the character recognition system will be described in connection with the flow charts and data structure diagrams depicted in FIGS. 2 through 7B. The character recognition system may be implemented in suitable programming of the massively parallel computer depicted in FIG. 1. Preliminarily, the character recognition system includes, for each of a plurality of training characters defining a character set, a plurality of training character images. The system selects, for a query character represented by a query character image, a training character image which is most similar to the query character image. The character recognition system then identifies the training character associated with the training character image as the query character.

The query character image is in the form of a query character image array, which is divided into an array of rows and columns. Similarly, each training character image is in the form of an array having a plurality of rows and columns. All of the training character image arrays, as well as the query character image array, have the same number of rows and the same number of columns. Each array element, or "pixel," in the image arrays is represented by a value indicating whether the image at that point is light (hereafter "on") or dark ("off"), for a monochrome image. In one embodiment, the query character image array and each training character image array has thirty-two rows and thirty-two columns. It will be appreciated that the number of rows and columns may differ from thirty-two, and that the number of rows does not have to correspond to the number of columns.

FIG. 2 is a flow diagram generally depicting the operations performed in connection with the character recognition system constructed in accordance with the invention. With reference to FIG. 2, the character recognition system first generates, for each training image, a training on distance array and a training off distance array (step 20). The distance arrays will be described more fully below in connection with FIG. 3, but in general each is an array having array elements corresponding to the array elements in the associated training character image array. Each array element in a training on distance array identifies the distance from the corresponding pixel to the nearest on pixel, in the associated training image. Similarly, each array element in a training off distance array identifies the distance from the corresponding pixel to the nearest off pixel, in the associated training image. In both cases, distance is physical, or Euclidian, distance, and is defined with pixels being the unit of measure.

Thereafter, the character recognition system uses the training on and off distance arrays, along with the query character image array, to generate an on/off deviation score (step 21). In this operation, for each training image, the system determines a distance value for each of the pixels in the query character image array using the training on and off distance arrays associated with the training image. In determining the distance value for a particular pixel in the query character image array, if the pixel is on the system uses the training on distance arrays, but if the pixel is off it uses the training off distance arrays. Thus, for each pixel in the query character image array, the distance value determined from the training on and off distance arrays for a particular training character image indicates the shortest distance, or minimum deviation, from that pixel in the query character image array to a pixel of the same on or off condition in the training character image array. To generate the on/off deviation score for a particular training character image, the system sums all of the distance values for all of the pixels of the training character image array. The sum for a particular training character image is a measure of the total deviation from the query character image to the training character image, thus indicating a measure of artifacts in the query character image that are not present in the training character image.

The character recognition system also uses the query character image array to generate query on and off distance arrays (step 22) in substantially the same way as it generates the training on and off distance arrays. As with the training on and off distance arrays, each of the query on and off distance arrays is an array having array elements corresponding to the pixels in the query character image array. Each array element in a query on distance array identifies the distance from the corresponding pixel to the nearest on pixel, in the query character image array. Similarly, each array element in the query off distance array identifies the distance from the corresponding pixel to the nearest off pixel in the query character image array. The distance arrays will be described more fully below in connection with FIG. 3.

After generating the query on and off distance arrays in step 22, the character recognition system uses them and the training character image array for each training character image to update the on/off deviation score for each training character image (step 23). The operations in this step are similar to those in step 21. In this step, for each training character image array, the system determines a distance value for each of the pixels in the training character image array using the query on and off distance arrays associated with the query character image. In determining the distance value for a particular pixel in the training character image array, if the pixel is on the system uses the query on distance arrays, but if the pixel is off it uses the query off distance arrays. Thus, for each pixel in the training character image array, the distance value determined from the query on and off distance arrays for a particular training character image indicates the shortest distance, or minimum deviation, from that pixel of the training character image array to a pixel of the same on or off condition in the query character image array.

To update the on/off deviation score for a particular training character image (step 23), the system adds all of the distance values for all of the pixels of the training character image array to the on/off deviation score generated in step 21. The result for a particular training character image is a measure of the total deviation from the query character image to the training character image (as generated in step 21), as well as the total deviation from the training character image to the query character image. The deviation from a training character image to the query character image, which is added in step 23, is a measure of the artifacts present in a training character image that are not in the query character image, and so the updated on/off deviation score provides a measure of all artifacts in each character image that are not present in the other character image, and thus enhances the likelihood that the query character will be correctly identified.

After the character recognition system has generated the updated on/off deviation score (step 23) for all of the training images, it identifies the training character image with the minimum updated on/off deviation score. The character associated with that training character image may be identified as the query character to be recognized (step 24).

Figure 3:
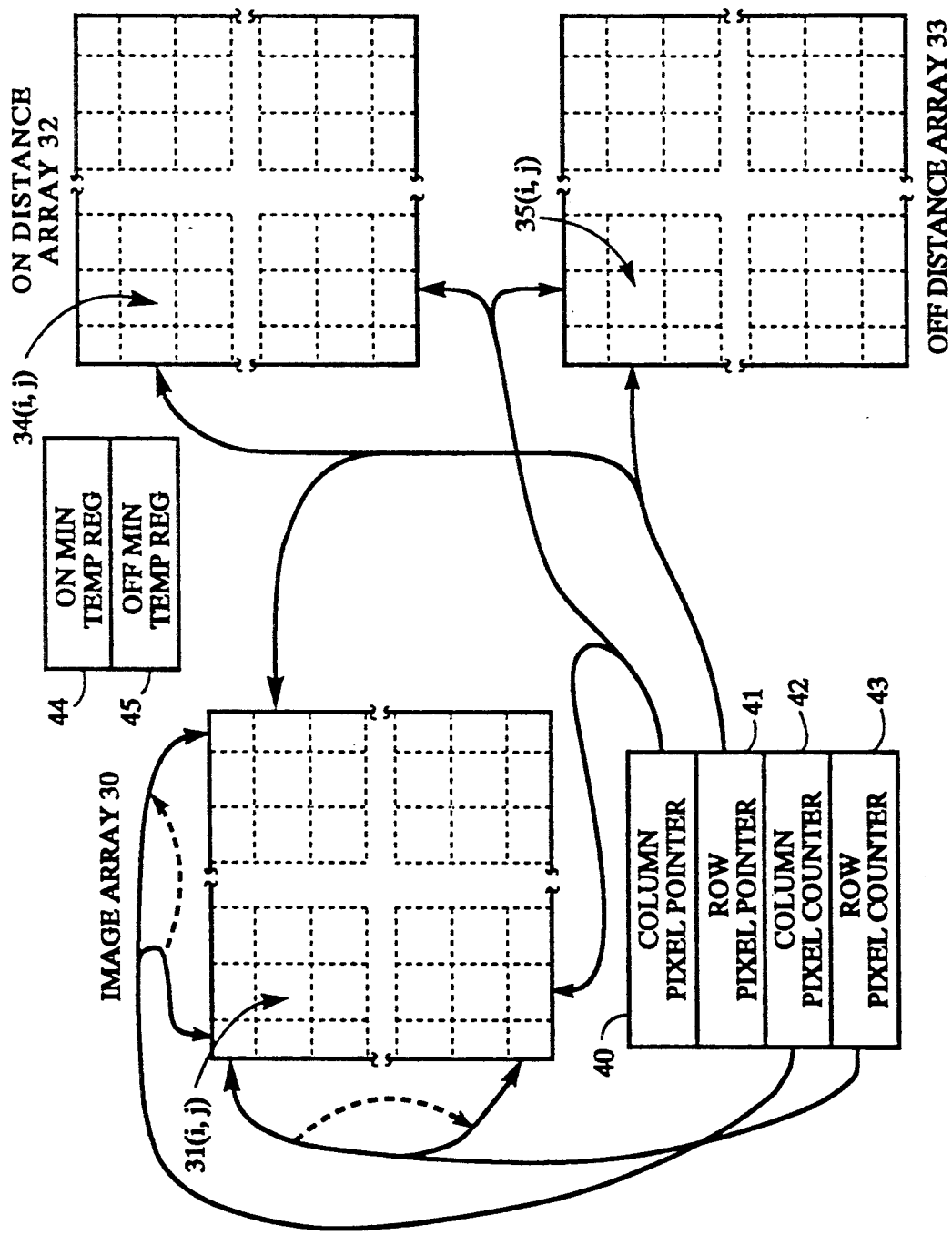
FIG. 3 depicts data structures that will be used in the character recognition system.

Before proceeding to a detailed description of the various operations described in FIG. 2, it would be helpful to describe various data structures that will be referred to therein, which are depicted in FIG. 3. With reference to FIG. 3, data defining both the training character images and the query character image, is organized in an image array 30. Image array 30, accordingly, represents the data structure used for the training character image array for a training character as well as for the query character image array for the query character. A training character image array will be generally identified by reference numeral 30T and the query character image array will be identified by reference numeral 30Q.

An image array 30 includes a plurality of array elements, or pixels, identified generally by reference number 31($i,j$), where index "i" identifies the row and index "j" identifies the column in the array 30. Each array element 31($i,j$) has one of two conditions or values, namely, on or off; if the condition of an array element 31($i,j$) is "on," the corresponding portion of the character image is light, whereas if the condition of an array element 31($i,j$) is "off," the corresponding portion is dark. It will be appreciated that, since each array element 31($i,j$) can be in one of two conditions, a single bit will suffice for the element. Array elements in the training character image array 30T will be identified by reference numeral 31T($i,j$), and array elements in the query character image array 30Q will be identified by reference numeral 31Q($i,j$).

FIG. 3 also depicts an on distance array 32 and an off distance array 33. As with image array 30, the on distance array 32 and off distance array 33 represents the data structure used for the training on and off distance arrays for a training character as well as for the query on and off distance arrays for the query character. The training on and off distance arrays will be identified by reference numeral 32T and 33T, respectively, and the query on and off distance arrays will be identified by reference numeral 32Q and 33Q, respectively. Each on and off distance array 32 and 33 includes a plurality of array elements identified generally by reference numeral 34($i,j$) and 35($i,j$), where index "i" identifies the row and index "j" identifies the column in the respective array 32 and 33. It will be appreciated that, each array element 34($i,j$) and 35($i,j$) stores a distance value that may comprise a plurality of bits, the number depending on the degree of precision desired for the distance value. The array elements in the training on and off distance arrays will be identified by reference numeral 34T($i,j$) and 35T($i,j$), respectively, and the arrays elements in the query on and off distance array will be identified by reference numeral 34Q($i,j$) and 35Q($i,j$), respectively.

In addition, several pointers 40 through 43 are provided to identify array elements in the arrays 30, 32 and 33, particularly during generation of the on and off distance arrays 32 and 33. As noted above, in connection with steps 20 and 22 (FIG. 2), a distance value is generated for each pixel in the training character image array (step 20) and query character image array (step 22). A column pixel pointer 40 and a row pixel pointer 41 are provided to identify the location, in the respective image array 30, of the array element 31($i,j$) for each pixel as the distance value is being generated therefor. It will be appreciated that the column and row pixel pointers 40 and 41 also point to the array elements 34($i,j$) and 35($i,j$) in the respective on and off distance arrays 32 and 33 that is associated with the array element 31($i,j$) for the pixel for which the distance value is being generated.

As noted above, the distance value that is generated is the distance from the pixel whose array element is pointed to by column and row pixel pointers 40 and 41, to the nearest pixel which is on (in the case of on distance array 32) or off (in the case of off distance array 33). In that operation, distance values are iteratively generated for each of the on and off pixels associated with the array elements 31($i',j'$) in the image array 30, and a running minimum distance is maintained. Two pointers, namely, column pixel counter 42 and row pixel counter 43 are provided which iteratively point to the array elements 31($i',j'$) for which the distance is determined to the array element pointed to by pointers 40 and 41, effectively scanning through all of the array elements 31($i',j'$) in the image array 30.

During the iterations, the minimum distances are stored in an on minimum temporary register 44, if the array element pointed to by column and row pixel counters 42 and 43 has an on pixel, or in an off minimum temporary register 45, if the array element pointed to by the counters 42 and 43 has an off pixel. After the column and row pixel counters 42 and 43 have scanned through all of the array elements in the image array 30, the minimum on and off distance values have been determined for the pixel of the array element 31($i,j$) pointed to by column and row pixel pointers 40 and 41, which are stored in registers 44 and 45. These values may be copied into the array elements 34($i,j$) and 35($i,j$) of on and off distance arrays 32 and 33, respectively, that are pointed to by column and row pixel pointers 40 and 41. These operations are repeated for all array elements 31($i,j$) in the image array 30.

Figure 4C:
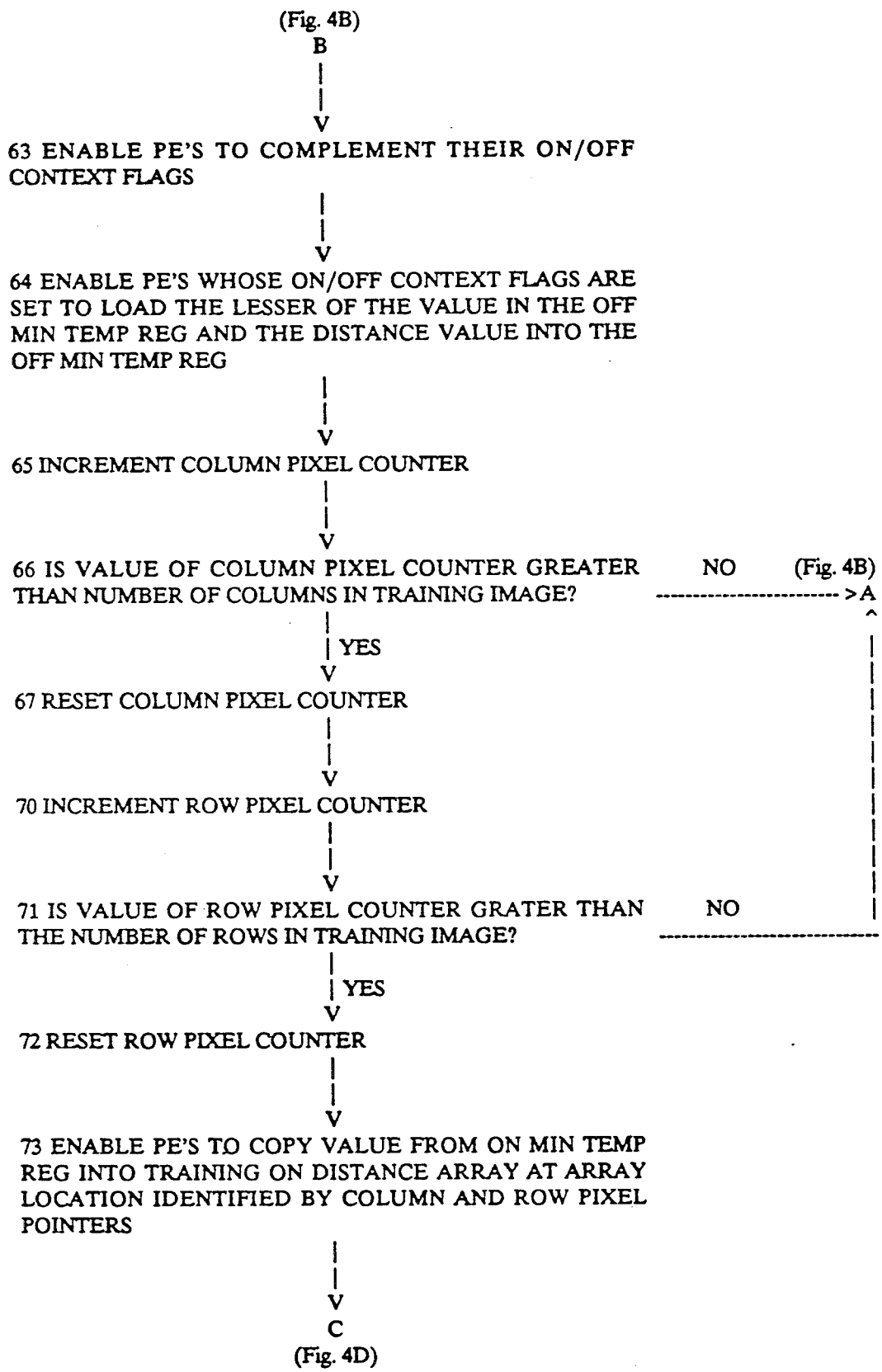
Figure 4D:
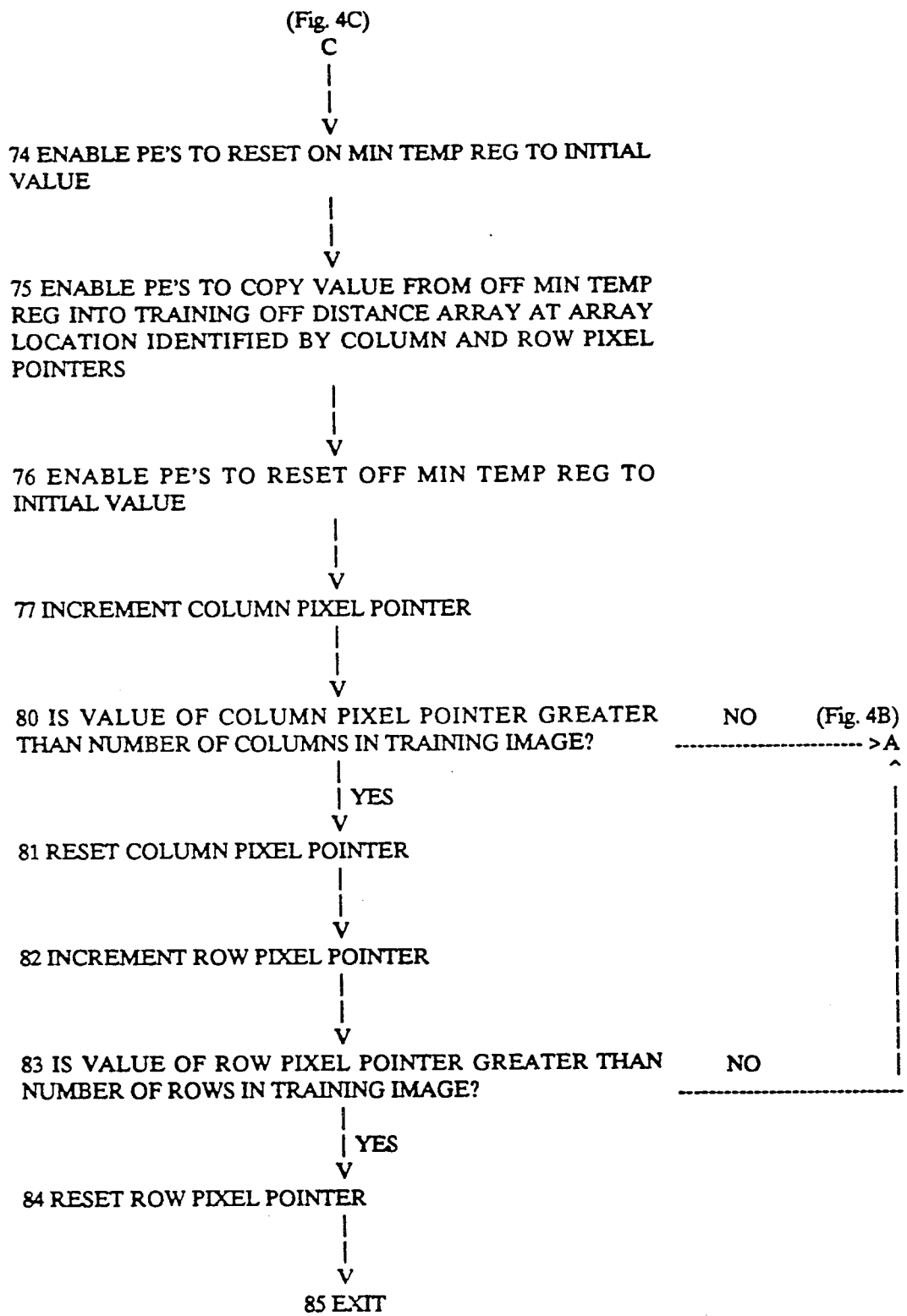
Figure 5B:
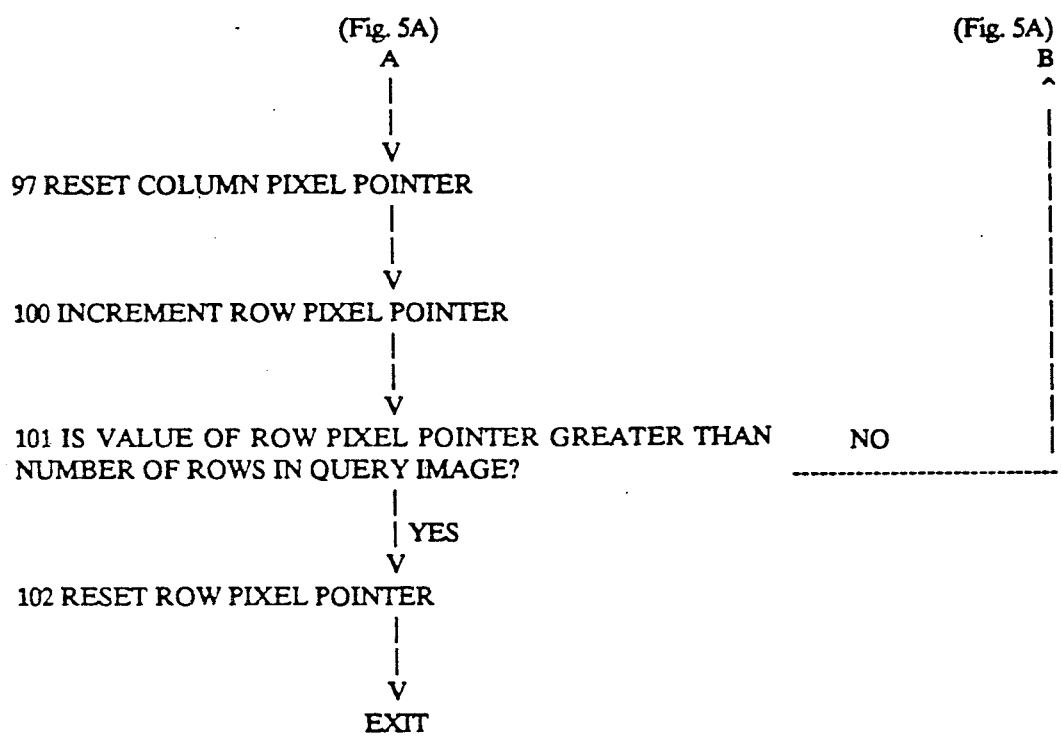
Figure 6C:
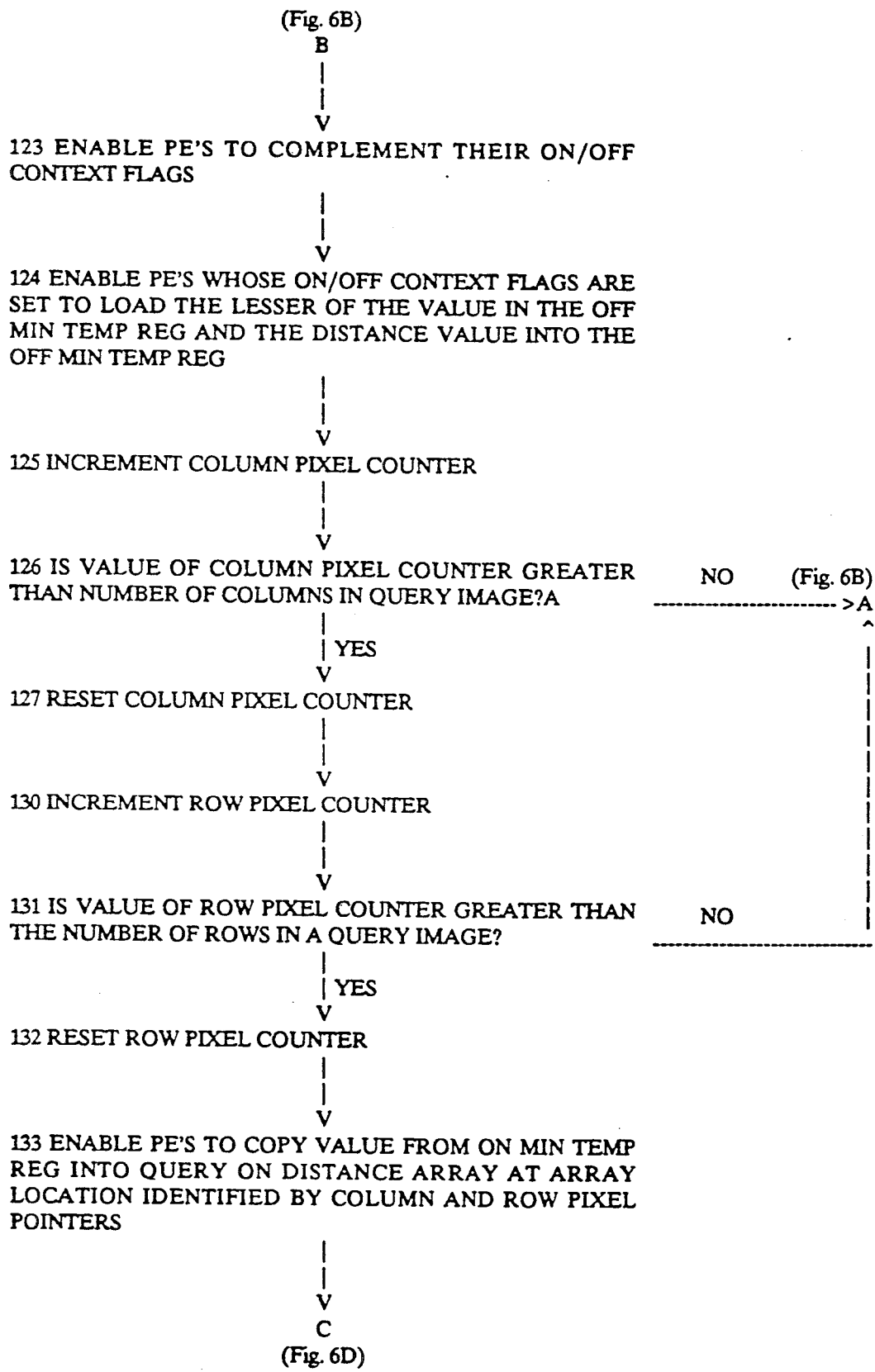
Figure 6D:
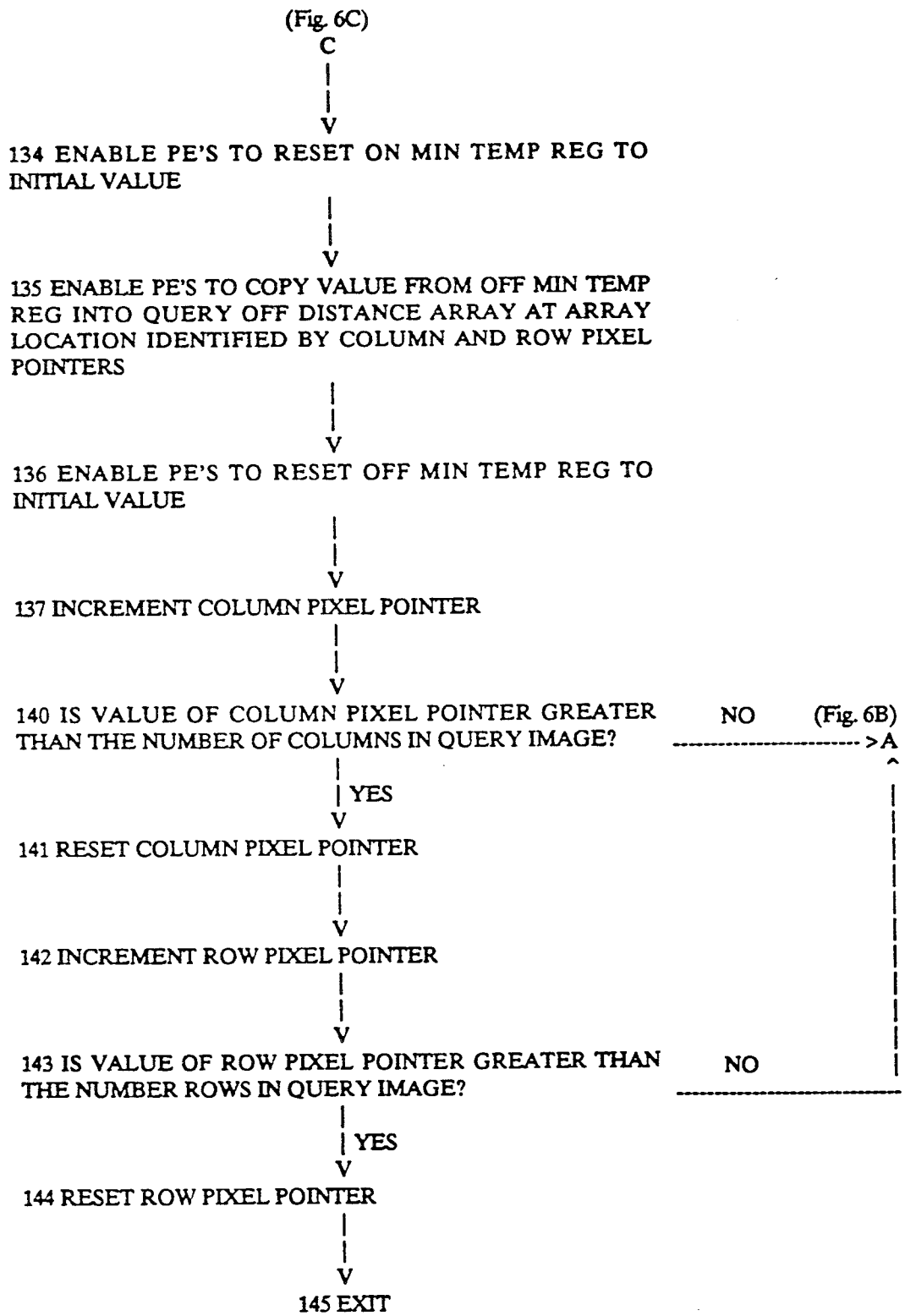
Figure 7B:
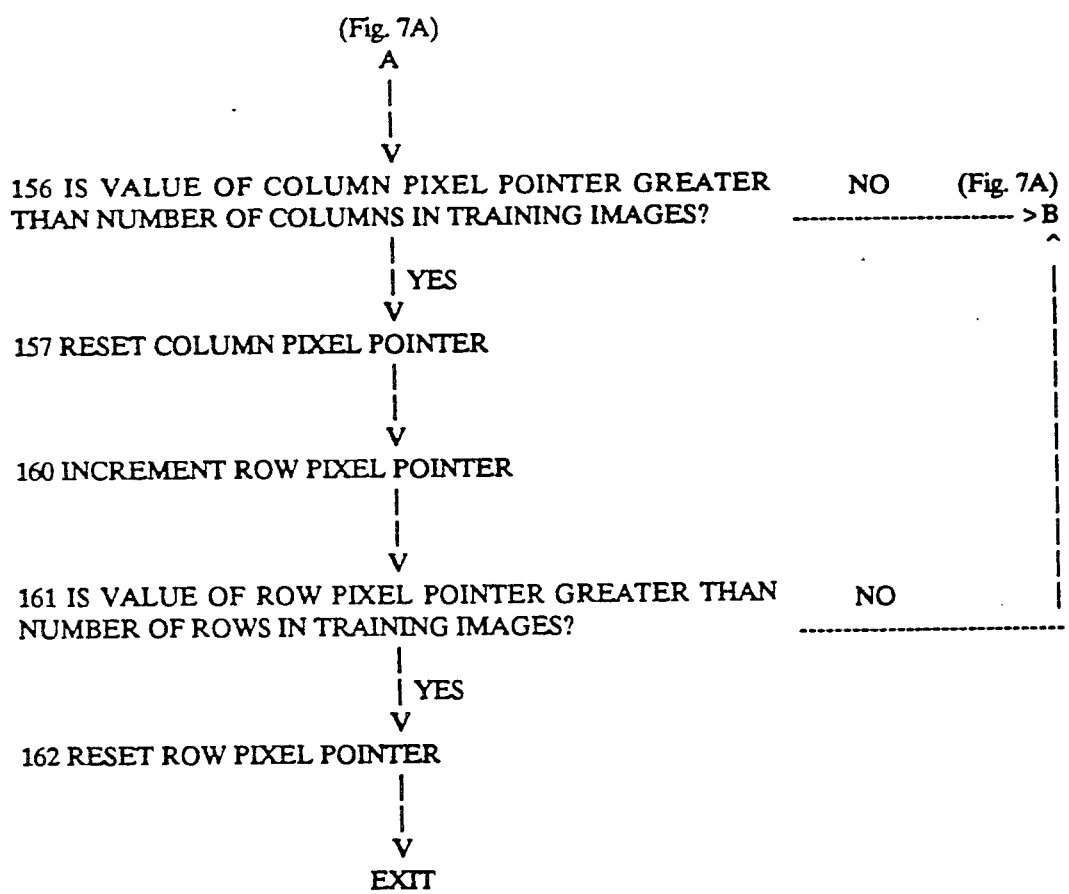

With this background, the details of various operations described in FIG. 2 will be described in connection with the flow diagrams in FIGS. 4A through 7B. FIGS. 4A through 4D depict the operations, generally identified in step 20 (FIG. 2), of establishing training on and off distance arrays for the training images. FIGS. 5A and 5B depict the operations, generally identified in step 21, of using the query character image array and the training on and off distance arrays to generate an on/off deviation score. FIGS. 6A through 6D depict operations, generally identified in step 22, of generating the query on and off distance array, and FIGS. 7A and 7B depict operations, generally identified in step 23, of using the query on and off distance arrays to update the on/off deviation score.

It will be appreciated that the ability of the character recognition system to accurately recognize the query character will be enhanced if it has a large number of training character images for each character to be recognized, preferably hundreds or thousands. The greater the number of training character images that are provided for a particular character to be recognized, the greater the likelihood that the query character image and a training character image for the correct character will have the most similar artifacts. In one particular embodiment, the character recognition system includes a massively parallel computer, as described above in connection with FIG. 1, with each processing element $13(i)$ being assigned to one training character image and processing the data therefor. Essentially, at least the training character image array 30T and on and off distance arrays 32T and 33T for a particular training character image are stored in the memory $15(i)$ of the respective processing element $13(i)$. If the number of training character images is greater than the number of processing elements $13(i)$, multiple training character images may be assigned to at least some of the processing elements $13(i)$ in, for example, a virtual processor arrangement such as described in U.S. Pat. No. 4,773,038, issued Sep. 20, 1988, to W. Daniel Hillis, and U.S. Pat. No. 4,827,403, Issued May 2, 1989, to Guy L. Steele, et al., both assigned to the assignee of the present application.

As noted above, FIGS. 4A through 4D depict the operations, generally identified in step 20 (FIG. 2), of establishing training on and off distance arrays 32T and 33T for the training character images. With reference to FIG. 4A, the host 10 (FIG. 1) first establishes the column pixel pointer 40 and row pixel pointer 41 (step 50) to identify the column and row, respectively, of the array elements $31T(i,j)$ for which the on and off distance values are to be determined. In addition, the host 10 establishes the column and row pixel counters 41 and 42.

The host 10 also enables the processing elements $13(i)$ to, in parallel, establish the on and off minimum temporary registers 44 and 45 (step 52) and a training on distance array and a training off distance array (step 53) in their respective memories $15(i)$. In enabling establishment of the on and off minimum temporary registers 44 and 45 (step 52), the host 10 enables the processing elements $13(i)$ to load a high initial value, effectively infinity, into the respective registers.

In addition, the host 10 enables the processing elements $13(i)$ to, in parallel, establish respective on/off context flags (step 54), which may correspond to context flags $18(i)$, to permit conditioning of processing of selected ones of the subsequent operations by the processing elements $13(i)$. The host 10 further enables the processing elements $13(i)$ to establish, in their respective memories $15(i)$, a training character image array 30T, and enables loading therein of the training character image array assigned to the particular processing element $13(i)$ (step 55). The training character image arrays may, for example, be stored in the mass data store 17 and be transferred to the processing elements $13(i)$ in a conventional manner. Initially the column and row pixel pointers 40 and 41 and the column and row pixel counters 42 and 43 all have the value zero. In that case, they all point to the array element $31(0,0)$ of each training character image arrays 30T, which will be identified as the upper left-hand array element.

Following step 55, the host 10 proceeds to a series of iterations to enable the processing elements $13(i)$ to determine, during each iteration, distance values indicating the distance from an array element $31T(i,j)$ to the nearest on an off pixel, which distance values are stored in the array elements $34T(i,j)$ and $35T(i,j)$ of the training on and off distance arrays 32T and 33T, respectively. During each iteration, in finding a distance value representing the distance to the nearest on and off pixel, the host 10 enables the processing elements $13(i)$ to (i) determine, during a series of iterations for the array elements $31T(i',j')$ of the training character image array 30, the condition of the pixel, as indicated by the training character image array stored in the array element $31T(i',j')$, and (ii) if the distance value to the array element $31(i',j')$ is less than the distance value in the on or off minimum temporary register 44 or 45, depending on the condition of the pixel, store the distance value in the register 44 or 45. At the end of the iterations for a particular array element $31T(i,j)$, the on and off minimum temporary registers 44 and 45 will contain values identifying the distances to the nearest on and off pixel, respectively, which the host 10 enables the processing elements $13(i)$ to store in the array elements $34T(i,j)$ and $35T(i,j)$ of training on and off distance arrays 32 and 33.

More specifically, following step 55, the host sequences to steps 56, 57 and 60. In those steps, the host 10 determines a distance value identifying the distance from the pixel represented by the array element pointed to by column and row pixel pointers 40 and 41 and the array element pointed to by column and row pixel counters 42 and 43. The host 10 determines a distance value by first determining the horizontal distance between the array element $31T(i,j)$ pointed to by the column and row pixel pointers 41 and 42 and the array element $31T(i', j')$ pointed to by the column and row pixel counters 42 and 43, squaring the horizontal distance and storing it in a temporary buffer (step 56). The horizontal distance is the difference between the column positions of the array elements as identified by the column pixel pointer 40 and the column pixel counter 42.

The host 10 also determines the vertical distance between the array elements $31T(i,j)$ and $31T(i',j')$, squares the vertical distance and adds it to the value in the temporary buffer (step 57). Thereafter, the host 10 determines the square root of the value in the temporary buffer (step 60), which is the distance value for the distance between the two array elements $31T(i,j)$ and $31T(i',j')$. The host 10 may buffer the determined distance value in the temporary buffer.

After determining the distance value, the host 10 enables the processing elements $13(i)$ to use it in updating the values in their respective on and off minimum temporary registers 44 and 45. In each processing element $13(i)$, the particular on or off minimum temporary register 44 or 45 that is to be used depends upon the on or off condition of the pixel associated with array element 31T(i',j'). Accordingly, the host 10 enables the processing elements 13(i) to copy the training character image array from the array element 31T(i',j') that is identified by the column and row pixel counters 42 and 43 into their respective on/off context flags (step 61). For each training image, the training character image array, and thus the on/off context flag, identifies the on or off condition of the training character image pixel associated with the array element 31T(i',j'). The host 10 then enables the processing elements 13(i) whose on/off context flags are set to load the lesser of the value currently in the respective on minimum temporary register 44 or the distance value into the on minimum temporary register 44 (step 62).

Thereafter, the host enables the processing elements 13(i) to complement their on/off context flags (step 63). Accordingly, if the array element 31T(i',j') of the training character image array 31T is set, and thus in step 62 the on/off context flag, is set, indicate that the pixel is on, after the on/off context flag is complemented it will be reset. However, if the array element 31T(i',j') is reset condition indicating that the pixel is off, after the context flag is complemented in step 63 will have a set condition. The host 10 then enables the processing elements whose on/off context flags are at that point set to load the lesser of the value currently in the off minimum temporary register 45 or the distance value into the off minimum temporary register 45 (step 64).

Following step 64, the host 10 performs several operations to adjust the column and row pixel counters 42 and 43 to point to a new array element 31T(i',j'). The host 10 iteratively enables the operations of steps 56, 56 and 60 through 64 to be performed in connection with array elements 31T(i',j') across each row, and iteratively across the subsequent rows of the training character image array, until the operations have been performed in connection with all array elements 31(j',j'). Accordingly, after step 64, the host 10 increments the column pixel counter 42 (step 65) to point to new array element 31T(i',j'+1) and determines whether the value of the column pixel counter 42 is greater than the number of columns in the training character image array (step 66). If the host 10 determines in step 66 that the value of the value of the column pixel counter 42 is not greater than the number of columns in the training character image arrays 30T, all of the array elements 31T(i',j') in a row have not been processed. In that case, the host 10 returns to step 56 and repeats the steps beginning therewith with respect to the next array elements 31T(i',j'+1) in the row.

On the other hand, if the host 10 determines in step 66 that the value of the column pixel counter 42 is greater than the number of columns in the training character image array 30, all of the array elements 31T(i',j') in the current row, pointed to by the row pixel counter 43, have been processed. In that case, the host 10 resets the column pixel counter 42 (step 67) and increments the row pixel counter 43 (step 70) to point to array element 31T(i'+1,0). Thereafter, the host 10 determines whether all of the rows in the training character image array 30T have been processed for the array element 31T(i,j) pointed to by the column and row pixel pointers 40 and 41. In that operation, the host 10 determines whether the value of the row pixel counter 43 is greater than the number of rows in the training character image array 30T (step 71). If not, all of the rows in the training character image array 30T have not been processed, and so it returns to step 56 to process the first array element 31T(i'+1,3) in the next row.

However, if the host 10 determines, in step 71, that all of the rows in the training character image array 30T have been processed for the array element 31T(i,j) pointed to by the column and row pixel pointers 40 and 41, it resets the row pixel counter 43 (step 72) and proceeds to enable the contents of the on and off minimum temporary registers 44 and 45 to be copied to the appropriate array elements in the training on and off distance arrays 32T and 33T. In particular, after step 72 the host enables the processing elements 13(i) to, in parallel, copy the values stored in their respective on minimum temporary registers 44 to the array elements 34T(i,j) in the respective training on distance arrays 32T pointed to by the column and row pixel pointers 40 (step 73). The host 10 then enables the processing elements to load the original initial value (infinity) into their respective on minimum temporary registers 44 (step 74).

In addition, the host enables the processing elements 13(i) to, in parallel, copy the values stored in their respective off minimum temporary registers 45 to the array elements 35T(i,j) in the respective training off distance arrays 33T pointed to by the column and row pixel pointers 40 (step 75). The host 10 then enables the processing elements to load the original initial value (that is, infinity) into their respective off minimum temporary registers 45 (step 76).

Thereafter, the host 10 performs a series of operations, defined by steps 77 and 80 through 84 to determine whether minimum on and off distance values have been determined for all of the array elements 31T(i,j) and, if not, to adjust the values of the column and row pixel pointers 40 and 41 to identify another array element 31T(i,j) in the training character image arrays 30. These operations are similar to steps 65 through 67 and 70 through 72. In particular, the host first increments the column pixel pointer 40 (step 77) and determines whether the value of the column pixel pointer is greater than the number of columns in the training image (step 80). If not, the column pixel pointer 40 points to the next array element 31T(i,j+1) in the current row "i" identified by the value of the row pixel pointer 41, and the system returns to step 56 (FIG. 4B) to generate new minimum training on and off distance values therefor.

If, however, the host 10 determines in step 80 that the value of the column pixel pointer 40 is greater than the number of columns in the training image, it sequences to step 81 in which it resets the column pixel pointer 40. In addition, it increments the row pixel pointer 41 (step 82) and determines whether the value of the row pixel pointer 41 is greater than the number of rows in the training image (step 83). If not, the row pixel pointer 41 points to the first array element 31T(i+1,0) in the next row "i" identified by the value of the row pixel pointer 41, and the system returns to step 56 (FIG. 4B) to generate new minimum training on and off distance values therefor.

If, however, the host 10 determines in step 83 that the value of the row pixel pointer 41 is greater than the number of rows in the training character image array 30T, it sequences to step 84 in which it resets the column pixel pointer 40, and thereafter exits (step 85). At this point, the host 10 will have enabled generation of array elements 34T(i,j) and 35T(i,j) in the training on and off distance arrays 32T and 33T, respectively, for all of the array elements 31T(i,j) of the training character image array 30T.

FIGS. 5A and 5B depict the operations, generally identified in step 21 (FIG. 2), of using the query character image array 30Q and the training on and off distance arrays 32T and 33T to generate on/off deviation scores for the training images. The on/off deviation score generated for each training character image in FIGS. 5A and 5B represents a measure of the deviation resulting from artifacts in the query character image that are not present in the respective training character image. With reference to FIG. 5A, the host 10 first establishes and initializes a column pixel pointer 40 and a row pixel pointer 41 to iteratively identify the rows and columns of the query character image array 30Q (step 90). In addition, the host 10 enables the processing elements 13($i$) to, in parallel, each establish an on/off score buffer (step 91).

Thereafter, the host 10 initiates a series of iterations, for the various array elements 31Q($i,j$) in the query character image array 30Q. During each iteration, the host 10 determines whether the pixel of the query image associated with the array element 31Q($i,j$) is on or off, and enables the processing elements 13($i$) to retrieve the distance value from the corresponding array element 34T($i,j$) or 35T($i,j$) of the training on or off distance array 32T or 33T, and add it to the contents of the on/off deviation score buffer.

More specifically, following step 91 the host 10 sequences to step 92 in which it determines the condition of the array element 31Q($i,j$) of the query character image array associated with the pointed to by the column and row pixel pointers 40 and 41. In that operation, the host 10 identifies the array element 31Q($i,j$) of the query character image array 30Q, and retrieves its contents. Thereafter, the host 10 enables the processing elements 13($i$) to retrieve the contents of the array element 34T($i,j$) or 35T($i,j$) of the training on or off distance array 32T or 33T pointed to by the column and row pixel pointers 40 and 41 (step 93).

The host 10 uses the value in the array element 31Q($i,j$) of the query character image array 30Q to determine whether to enable retrieval from the training on distance array 32T or the training off distance array 33T. In particular, if the value of the array element 31Q($i,j$) identifies the off condition, the host enables retrieval from the training off distance array 31T. On the other hand, if the value of the array element 31Q($i,j$) identifies the on condition, the host 10 enables retrieval from the training on distance array 32T. The value retrieved by each processing element 13($i$) from the training on or off distance arrays 32T and 33T indicates the distance from the pixel of the query character image to the nearest pixel of the respective training character image of the same condition. Accordingly, the value represents a measure of the deviation of the artifact that is present in the query character image to the closest corresponding artifact in the training character image.

After enabling retrieval from the appropriate training on or off distance array 32T or 33T (step 93), the host 10 enables the processing elements 13($i$) to, in parallel, add the retrieved values to the contents of their respective on/off deviation score buffers (step 94). Thereafter, the host 10 performs a series of operations, defined by steps 95 through 97, 100 and 101, to determine whether minimum on and off distance values have been determined for all of the array elements 31Q($i,j$) and if not to adjust the values of the column and row pixel values 40 and 41 to point to another array element 31Q($i,j$) in the query character array 30Q. In particular, the host first increments the column pixel pointer 40 (step 95) and determines whether the value of the column pixel pointer 40 is greater than the number of columns in the query character image array 30Q (step 96). If not, the column pixel pointer 40 points to the next array element 31Q($i,j+1$) in the current row "i" identified by the value of the row pixel pointer 41, and the system returns to step 91 to repeat the operations for that array element.

If, however, the host 10 determines in step 96 that the value of the column pixel pointer 41 is greater than the number of columns in the query character image array 30Q, it sequences to step 97 in which it resets the column pixel pointer 40. In addition, it increments the row pixel pointer 41 (step 100) and determines whether the value of the row pixel pointer 41 is greater than the number of rows in the query character image array 30Q (step 101). If not, the row pixel pointer 41 points to the first array element 31Q($i+1,0$) in the next row "i" identified by the value of the row pixel pointer 41, and the system returns to step 92 to repeat the operations for that array element.

If, however, the host 10 determines in step 101 that the value of the row pixel pointer 41 is greater than the number of rows in the query character image array 30Q, it sequences to step 102 in which it resets the column pixel pointer 40, and thereafter exits (step 103). At that point, the host has enabled the processing elements 13($i$) to, in parallel, generate on/off deviation scores for the training images, each score representing a measure of the deviation resulting from artifacts in the query character image that are not present in the respective training character image.

FIGS. 6A through 6D depict operations, generally identified in step 22, of generating the query on and off distance arrays 32Q and 33Q. The operations are similar to those described above in connection with FIGS. 4A through 4D, except that they are performed using the query character image array 30Q instead of the training character image arrays 30T. Accordingly, the operations will not be described in detail. As depicted in FIGS. 6A through 6D, the query character image array 30Q is loaded into the memories 15($i$) of each of the processing elements 13($i$), and the host 10 enables the processing elements 13($i$) to, in parallel, generate query on and off distance arrays 32Q and 33Q. It will be appreciated, however, that the query on and off distance arrays 32Q and 33Q generated by the processing elements 13($i$) will all be identical, and the host 10 may instead generate the query on and off distance arrays 32Q and 33Q itself and transfer the generated arrays to the processing elements 13($i$). The host 10 may accomplish this either by transferring the arrays 32Q and 33Q to the microcontroller 11 and enabling it to broadcast them to the processing elements 13($i$), or by storing the arrays in the mass data store 17 and them to be transferred to the processing elements.

FIGS. 7A and 7B depict operations, generally identified in step 23, of using the query on and off distance arrays 32Q and 33Q to, in parallel, update the on/off deviation scores for the processing elements 13($i$). The updates for the on/off deviation score generated for each training character image in FIGS. 7A and 7B represents a measure of the deviation resulting from artifacts in the respective training character images that are not present in the query character image. The operations depicted in FIGS. 7A and 7B are generally similar to the operations described above in connection with FIGS. 5A and 5B, except as follows. When the host 10 is enabling the processing elements 13(i) to use the training on and off distance arrays 32T and 33T to generate the on/off deviation score for the query character image (FIGS. 5A and 5B), since there is only one query character image all of the processing elements 13(i) will, for each array element 31Q(i,j) of the query character image array 30Q, be using either the training on and off distance array 32T or 33T as determined by the condition of the array element 31Q(i,j). Accordingly, in the sequence depicted in FIG. 5A, only one step, namely step 93, is required for each array element 31Q(i,j).

However, when the host is enabling the processing elements 13(i) to use the query on and off distance arrays 32Q and 33Q to generate the on/off deviation score for the query character image (FIGS. 7A and 7B), since each processing element will be processing a different training character image, and the array elements 31T(i,j), for a particular value of "i" and "j", may have diverse conditions, the host 10 initiates steps for each condition of the array elements during each iteration. Thus, during each iteration, for those processing elements 13(i) whose array element 31T(i,j) is set, the host 10 enables the processing elements 13(i) to use the value from the query on distance array 32Q in updating the on/off deviation score (step 152). On the other hand, during each iteration, for those processing elements whose array element 31T(i,j) is clear, the host 10 enables the processing elements 13(i) to use the value from the query off distance array 33Q in updating the on/off deviation score (step 154).

As noted above, in connection with FIG. 2, the result at the end of step 23 is, for each processing element 13(i) an updated on/off deviation score that reflects artifacts in both the query character image and the processing element's training character image that are not present in the other. The host 10 enables the processing elements 13(i) in the processor array 12 to perform a global minimum operation with respect to the updated on/off deviation score to identify the processing element 13(i) with the lowest updated on/off deviation score. The training character associated with the training character image of the processing element 13(i) with the lowest updated on/off deviation score is the recognized character for the query character.

It will be appreciated that a number of variations may be made in the detailed operations described in connection with FIGS. 4A through 7B and achieve substantially the operations as described above in connection with FIG. 2. For example, it will be recognized that, for a given array element 31(i,j) in an image array 30, either the on or off distance value to be stored in the corresponding array element 34(i,j) or 35(i,j) in the on or off distance arrays 32 or 33 will always be zero. Accordingly, instead of having separate on and off distance arrays, a single distance array can be provided in which each array element has a condition flag and a value field. The condition flag indicates the on or off condition of the pixel, and the distance value is stored in the value field.

In addition, several sequences in FIGS. 4A through 7B are provided to accommodate the fact that in the computer, as depicted in FIG. 1, the host 10, through the microcontroller 11, enables all of the processing elements 13(i) essentially perform precisely the same operation at the same time, conditioned only by their respective context flags 18(i). That limitation requires the host 10, when enabling generation of array elements 34(i,j) and 35(i,j) for the on and off on and off distance arrays 32 and 33, to essentially enable scanning through all of the array elements 31(i',j') of the image array 30. In that case, scanning is efficiently performed by adjusting the column and row pixel counters 42 and 43 as described in FIGS. 4A through 4D and 6A through 6D.

However, if the limitation that all of the processing elements 13(i) to essentially perform precisely the same operation at the same time is removed, such that the processing elements can operate generally independently in response to general commands from the host 10 or a microcontroller 11, the generation of the on and off distance maps 32 and 33 can be accomplished in a number of diverse ways. For example, in generating on and off distance values for an array element 31(i,j) of a training or query character image array 30T or 30Q, a processing element 13(i) can, for a particular array element 31(i,j), begin with that element and, during successive iterations, determine the conditions of pixels associated with array elements centered thereon, increasing the distance from array element 31(i,j) during subsequent iterations. It will be appreciated that the processing element 13(i) need only determine the minimum distance for an array element whose pixel is of the opposite condition as the particular array element 31(i,j), since the distance used in the on or off distance map 32 or 33 of the same condition is zero.

Furthermore, it will be recognized that, while the character recognition system has been described as including both on and off distance arrays 32 and 33, acceptable character recognition results may be obtained if only one on or off distance array 32 or 33 is provided. In that case, the other array is not generated or used in the operations depicted in FIGS. 4A through 7B.

It will be further recognized that, since the arrangements for generating the training on and off distance arrays 32T and 33T (step 20, FIG. 2, and FIGS. 4A through 4D) are similar to the arrangements for generating the query on and off distance arrays 32Q and 33Q (step 22, FIG. 2, and FIGS. 6A through 6D), respectively, the arrangements need only be provided once, and not separately provided. In that case, the host 10 can selectively enable the generation, using the training character image arrays 30T, of the training on and off distance arrays, and thereafter enable the generation, using the query character image array 30Q, of the query on and off distance arrays. Similarly, the arrangements for generating (step 21, FIG. 2, and FIGS. 5A and 5B), and updating (step 21, FIG. 2, and FIGS. 7A and 7B), the on/off deviation scores, the arrangements need only be provided once.

In addition, it will be appreciated that, while the character recognition system has been described as selecting one training character image with the minimum updated on/off deviation score, as representing the recognized character, that is not required. For example, instead of selecting the one training character image which has the lowest updated on/off deviation score, it may be desirable to determine a statistical distribution of minimum on/off deviation score around the minimum and a standard deviation therefor and select the most frequent training character associated with the training character images within a selected function of the standard deviation.

It will be further appreciated that optimal recognition results will be achieved if the training character images and the query character image are normalized within the respective training character image arrays and query character image array. That is, it is desirable that a character image be generally centered in the respective image array, with either (i) the top and bottom of the character image being represented by at least one pixel in both the upper and lower rows of the image array, with the character image being generally centered around the center column of the image array, or (ii) the left and right sides of the character image be represented by at least one on pixel in both the left-most and right-most columns of the image array, with the character image being generally centered around the center row of the image array.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A character recognition system for recognizing a character associated with a query character, the query character having a query character image defined by a query character image array having a pattern of query character array elements each having an on condition or an off condition, in response to training character image arrays each associated with a character identification, each training character image array being represented by patterns of training character array elements each corresponding to a query character array element and each having an on condition or an off condition, said system comprising:

A. distance generation means for generating, for each training character image array, an elemental distance value representing, for each training character array element, the distance from the query character array element to a proximate training character array element having the same on or off condition as the corresponding query character array element;
   B. deviation score generating means for generating, for each training character image array, a deviation score in response to the elemental distance values generated by said distance generation means; and
   C. character identification means for generating a character identification for the query character in response to the deviation scores generated by said deviation score generating means and the character identification associated with the respective training character image arrays.

2. A character recognition system for recognizing a character associated with a query character, the query character having a query character image defined by a query character image array having a pattern of query character array elements each having an on condition or an off condition, in response to training character image arrays each associated with a character identification, each training character image array being represented by patterns of training character array elements each corresponding to a query character array element and each having an on condition or an off condition, said system comprising:

A. distance generation means for generating, for each training character image array, an elemental distance value representing, for each query character array element, the distance from the query character array element to a proximate query character array element having the same on or off condition as the corresponding training character array element;
   B. deviation score generating means for generating, for each training character image array, a deviation score in response to the elemental distance values generated by said distance generation means; and
   C. character identification means for generating a character identification for the query character in response to the deviation scores generated by said deviation score generating means and the character identification associated with the respective training character image arrays.

3. A character recognition system for generating a character identification value associated with a query character, the query character having a query character image array having a pattern of query character array elements each having an on value or an off value, said system comprising:

A. a plurality of training character image arrays, each associated with a character identification value, each training character image array having a pattern of training character array elements each having an on value or an off value;
   B. training distance array generating means for generating for each training character a training distance array, each training distance array having a plurality of training distance array elements each associated with a training character array element of the associated training character image array, each training distance array element identifying a distance value from the corresponding training character array element to the training character array element having a selected on value or off value;
   C. query/training artifact score determining means for generating for each training distance array a deviation score, each deviation score representing an aggregate of distance values from those of said training distance array elements which are associated with training character image elements which have an on value or an off value which differs from the on value or off value of a corresponding query character array element of said query character image array; and
   D. character identification means for generating the character identification value for the query character in response to said deviation scores generated by said query/training artifact score determining means.

4. A character recognition system as defined in claim 3 in which said training distance array generating means comprises:

A. a training temporary store for storing a training distance value;
   B. a training character array element identifier for identifying a training character array element;
   C. training distance value determination means for iteratively determining a training distance value from each training character array element to the training character array element identified by the training character array element identifier;
   D. training distance value update generation means for selectively generating an updated training distance value for storage in said training temporary store for each iteration of said training distance value determination means in response to the training distance value stored in said training temporary store, the updated training distance value being determined by the training distance value determination means and the on value or off value of said training character array element; and E. training distance generation control means responsive to termination by said training distance value determination means for generating a training distance value for storage in the training distance array in response to the training distance value in the training temporary store, said training distance generation control means further updating said training character array element identifier to iteratively enable it to identify each training character array element of said training character image array.

5. A character recognition system as defined in claim 4 wherein said training distance value determination means includes training counter means for identifying, during each iteration, a training character array element from which it determines a distance value.

6. A character recognition system as defined in claim 5 wherein said training character image array has a plurality of rows and columns, said training counter means including a training row counter which generates a training row counter value and a training column counter which generates a training column counter value, and said training character array element identifier including a training row pointer which generates a training row pointer value and a training column pointer which generates a training column pointer value, said training distance value determination means generating said training distance value in response to a row difference value between said training row counter value and said training row pointer value and a training column difference value between said training column counter value and said training column pointer value.

7. A character recognition system as defined in claim 5 in which:
A. said training temporary store includes an on distance value store for storing an on distance value and an off distance value store for storing an off distance value;
B. said distance value update generation means for selectively generating, in response to the on value or off value of the training character array element identified by the row counter and the column counter, an on update distance value or an off update distance value in response to the distance value stored in the corresponding on distance value store or off distance value store and the updated distance value for the iteration as determined by the distance value determination means;
C. said training distance generation control means generating a distance value and storing said distance value in the training distance array, the training distance generation control means generating said distance value in response to the on distance value in the on distance value store and the off distance value in the off distance value store.

8. A character recognition system as defined in claim 7 in which each training distance array includes an on training distance array and an off training distance array,
A. said training distance generation control means generating an on training distance value for storage in the on training distance array in response to the on distance value in the on distance value store and an off training distance value for storage in the off training distance array in response to the off distance value in the off distance value store; and
B. said query/training artifact score determining means selectively using the on training distance values from the on training distance array and the off training distance values from the off training distance value array in generating said deviation score.

9. A character recognition system as defined in claim 8 in which:
A. said on training distance array comprises a plurality of on training distance array elements, each associated with a training character array element, the training distance generation control means storing the on training distance value in the on training distance array element associated with the training character array element that is identified by the training counter means during each iteration;
B. said off training distance array comprises a plurality of off training distance array elements, each associated with a training character array element, the training distance generation control means storing the off training distance value in the off training distance array element associated with the training character array element that is identified by the training counter means during each iteration; and
C. said query/training artifact score determining means, in generating a deviation score for a training distance array, generates the deviation score as an aggregate of
(i) an aggregate of on training distance values from those of said on training distance array elements associated with training character array elements which have an on value and which correspond to the query character array elements which have an off value, and
(ii) an aggregate of off training distance values from those of said off training distance array elements associated with training character array elements which have an off value and which correspond to the query character array elements which have an on value.

10. A character recognition system as defined in claim 7 in which:
A. each training distance array element of each training distance array includes a training distance array element value store and an associated training value flag having an on condition and an off condition;
B. said training distance generation control means, for each training distance array element, storing the on value or off value as said training distance array element value in said training distance array element value store and establishing the condition of the associated training value flag, both in response to the on value or off value of the training character array element identified by the training row counter and the training column counter; and
C. said query/training artifact score determining means, in generating said deviation score, selectively using the training distance values from the distance value stores of said training distance array elements in response to the on or off value of the corresponding query character array elements of the query character image array.

11. A character recognition system as defined in claim 3 further comprising:

A. query distance array generating means for generating a query distance array, said query distance array having a pattern of query distance array elements corresponding to the pattern of the query character array elements, each query distance array element identifying a distance value from the corresponding query character array element to the query character array element having a selected on value or off value;

B. training/query artifact score generating means for using said deviation score generated by said query/training artifact score determining means to generate for each training character image array an updated deviation score, the updated deviation score being generated further representing an aggregate of distance values from those of said query distance array elements which are associated with query character image elements which have an on value or an off value which differs from the on value or off value of a corresponding training character array element of the training character image array;

C. said character identification means using said updated deviation score for identifying a character as the query character in response to said updated deviation scores as updated by said training/query artifact score generating means.

12. A character recognition system as defined in claim 11 in which said query distance array generating means comprises:

A. a query temporary store for storing a query distance value;

B. a query character array element identifier for identifying a query character array element;

C. query distance value determination means for iteratively determining a query distance value from each query character array element to the query character array element identified by the query character array element identifier;

D. query distance value update generation means for selectively generating an updated query distance value for storage in said query temporary store for each iteration of said query distance value determination means in response to the query distance value stored in said query temporary store, the updated query distance value being determined by the query distance value determination means and the on value or off value of said query character array element; and E. query distance generation control means responsive to termination by said query distance value determination means for generating a query distance value for storage in the query distance array in response to the query distance value in the query temporary store, said query distance generation control means further updating said query character array element identifier to iteratively enable it to identify each query character array element of said query character image array.

13. A character recognition system as defined in claim 12 wherein said query distance value determination means includes query counter means for identifying, during each iteration, a query character array element from which it determines a query distance value.

14. A character recognition system as defined in claim 13 wherein said query character image array has a plurality of rows and columns, said query counter means including a query row counter which generates a query row counter value and a query column counter which generates a query column counter value, and said query character array element identifier including a query row pointer which generates a query row pointer value and a query column pointer which generates a query column pointer value, said query distance value determination means generating said query distance value in response to a row difference value between said query row counter value and said query row pointer value and a query column difference value between said query column counter value and said query column pointer value.

15. A character recognition system as defined in claim 13 in which:

A. said query temporary store includes an on distance value store for storing an on distance value and an off distance value store for storing an off distance value;

B. said query distance value update generation means for selectively generating, in response to the on value or off value of the query character array element identified by the row counter and the column counter, an on update distance value or an off update distance value in response to the distance value stored in the corresponding on distance value store or off distance value store and the updated distance value for the iteration as determined by the query distance value determination means;

C. said query distance generation control means generating a distance value and storing said distance value in the query distance array, the query distance generation control means generating said distance value in response to the on distance value in the on distance value store and the off distance value in the off distance value store.

16. A character recognition system as defined in claim 15 in which each query distance array includes an on query distance array and an off query distance array, A. said query distance generation control means generating an on query distance value for storage in the on query distance array in response to the on distance value in the on distance value store and an off query distance value for storage in the off query distance array in response to the off distance value in the off distance value store; and B. said training/query artifact score determining means selectively using the on query distance values from the on query distance array and the off query distance values from the off query distance value array in generating said deviation score.

17. A character recognition system as defined in claim 16 in which:

A. said on query distance array comprises a plurality of on query distance array elements, each associated with a query character array element, the query distance generation control means storing the on query distance value in the on query distance array element associated with the query character array element that is identified by the query counter means during each iteration;

B. said off query distance array comprises a plurality of off query distance array elements, each associated with a query character array element, the query distance generation control means storing the off query distance value in the off query distance array element associated with the query character array element that is identified by the query counter means during each iteration; and C. said training/query artifact score determining means, in generating a deviation score for a query distance array, generates the deviation score as an aggregate of
 (i) an aggregate of on query distance values from those of said on query distance array elements associated with query character array elements which have an on value and which correspond to the training character array elements which have an off value, and
 (ii) an aggregate of off query distance values from those of said off query distance array elements associated with query character array elements which have an off value and which correspond to the training character array elements which have an on value.

18. A character recognition system as defined in claim 15 in which:
A. each query distance array element of each query distance array includes a query distance array element value store and an associated query value flag having an on condition and an off condition;
B. said query distance generation control means, for each query distance array element, storing the on value or off value as said query distance array element value in said query distance array element value store and establishing the condition of the associated query value flag, both in response to the on value or off value of the query character array element identified by the query row counter and the query column counter; and
C. said training/query artifact score determining means, in generating said deviation score, selectively using the query distance values from the distance value stores of said query distance array elements in response to the on or off value of the corresponding training character array elements of the training character image array.

19. A character recognition system for generating a character identification value associated with a query character, the query character having a query character image array having a pattern of query character array elements each having an on value or an off value, using a plurality of training character image arrays, each associated with a character identification value, each training character image array having a pattern of training character array elements each having an on value or an off value, said system comprising
A. query distance generating means for generating a query distance array, said query distance array having a pattern of query distance array elements corresponding to the pattern of the query character array elements, each query distance array element identifying a distance value from the corresponding query character array element to the query character array element having a selected on value or off value;
B. training/query artifact score generating means for generating for each training character image array a deviation score representing an aggregate of distance values from those of said query distance array elements which are associated with query character image elements which have an on value or an off value which differs from the on value or off value of a corresponding training character array element of the training character image array; and C. character identification means for generating the character identification value for the query character in response to said deviation scores generated by said training/query artifact score determining means.

20. A character recognition system as defined in claim 19 in which said query distance array generating means comprises:
A. a query temporary store for storing a query distance value;
B. a query character array element identifier for identifying a query character array element;
C. query distance value determination means for iteratively determining a query distance value from each query character array element to the query character array element identified by the query character array element identifier;
D. query distance value update generation means for selectively generating an updated query distance value for storage in said query temporary store for each iteration of said query distance value determination means in response to the query distance value stored in said query temporary store, the updated query distance value being determined by the query distance value determination means and the on value or off value of said query character array element; and
E. query distance generation control means responsive to termination by said query distance value determination means for generating a query distance value for storage in the query distance array in response to the query distance value in the query temporary store, said query distance generation control means further updating said query character array element identifier to iteratively enable it to identify each query character array element of said query character image array.

21. A character recognition system as defined in claim 20 wherein said query distance value determination means includes query counter means for identifying, during each iteration, a query character array element from which it determines a query distance value.

22. A character recognition system as defined in claim 21 wherein said query character image array has a plurality of rows and columns, said query counter means including a query row counter which generates a query row counter value and a query column counter which generates a query column counter value, and said query character array element identifier including a query row pointer which generates a query row pointer value and a query column pointer which generates a query column pointer value, said query distance value determination means generating said query distance value in response to a row difference value between said query row counter value and said query row pointer value and a query column difference value between said query column counter value and said query column pointer value.

23. A character recognition system as defined in claim 21 in which:
A. said query temporary store includes an on distance value store for storing an on distance value and an off distance value store for storing an off distance value;
B. said distance value update generation means for selectively generating, in response to the on value or off value of the query character array element identified by the row counter and the column counter, an on update distance value or an off update distance value in response to the distance value stored in the corresponding on distance value store or off distance value store and the updated distance value for the iteration as determined by the distance value determination means;

C. said query distance generation control means generating a query distance value and storing said query distance value in the query distance array, the query distance generation control means generating said distance value in response to the on distance value in the on distance value store and the off distance value in the off distance value store.

24. A character recognition system as defined in claim 23 in which each query distance array includes an on query distance array and an off query distance array, A. said query distance generation control means generating an on query distance value for storage in the on query distance array in response to the on distance value in the on distance value store and an off query distance value for storage in the off query distance array in response to the off distance value in the off distance value store; and B. said training/query artifact score determining means selectively using the on query distance values from the on query distance array and the off query distance values from the off query distance value array in generating said deviation score.

25. A character recognition system as defined in claim 24 in which:

A. said on query distance array comprises a plurality of on query distance array elements, each associated with a query character array element, the query distance generation control means storing the on query distance value in the on query distance array element associated with the query character array element that is identified by the query counter means during each iteration;

B. said off query distance array comprise a plurality of off query distance array elements, each associated with a query character array element, the query distance generation control means storing the off query distance value in the off query distance array element associated with the query character array element that is identified by the query counter means during each iteration; and C. said training/query artifact score determining means, in generating a deviation score for a query distance array, generates the deviation score as an aggregate of (i) an aggregate of on query distance values from those of said on query distance array elements associated with query character array elements which have an on value and which correspond to the training character array elements which have an off value, and (ii) an aggregate of off query distance values from those of said off query distance array elements associated with query character array elements which have an off value and which correspond to the training character array elements which have an on value.

26. A character recognition system as defined in claim 23 in which:

A. each query distance array element of each query distance array includes a query distance array element value store and an associated query value flag having an on condition and an off condition;

B. said query distance generation control means, for each query distance array element, storing the on value or off value as said query distance array element value in said query distance array element value store and establishing the condition of the associated query value flag, both in response to the on value or off value of the query character array element identified by the query row counter and the query column counter; and C. said training/query artifact score determining means, in generating said deviation score, selectively using the query distance values from the distance value stores of said query distance array elements in response to the on or off value of the corresponding training character array elements of the training character image array.

27. A character recognition system for recognizing a character associated with a query character, the query character having a query character image defined by a query character image array having a pattern of array elements defining on pixels and off pixels for said query character image, said system comprising:

A. a plurality of processing elements, each including a memory;

B. control means comprising:
  i. training character image array establishment enabling means for enabling said processing elements to establish in parallel in their respective memories a training character image array, each training character image array being associated with a character identification value, each training character image array having a pattern of training character array elements each having an on value or an off value;
  ii. training distance array generating enabling means for enabling said processing elements to generate, in parallel for each training character, a training distance array in their respective memories, each training distance array having a plurality of training distance array elements each associated with a training character array element of the associated training character image array, each training distance array element identifying a distance value from the corresponding training character array element to the training character array element having a selected on value or off value;
  iii. query/training artifact score determining enabling means for enabling said processing elements to generate, for their respective training distance array, a deviation score, each deviation score representing an aggregate of distance values from those of said training distance array elements which are associated with training character image elements which have an on value or an off value which differs from the on value or off value of a corresponding query character array element of said query character image array; and C. character identification means for generating the character identification value for the query character in response to said deviation scores generated by said processing elements in response to said query/training artifact score determining enabling means.

28. A character recognition system as defined in claim 27 further comprising:

A. a training character array element identifier means for identifying a training character array element;
B. said training distance array generating enabling means comprising:
  i. training distance value determination enabling means for enabling said processing elements to, in parallel, iteratively determine a training distance value from each training character array element to the training character array element identified by the training character array element identifier;
  ii. training distance value update generation enabling means for enabling said processing elements to, in parallel, selectively generate for each iteration an updated training distance value for storage in respective training temporary stores in their respective memories, the updated training distance value being determined by the processing elements in response to the training distance values determined during processing in response to said training distance value determination enabling means and the on value or off value of said training character array element; and
  iii. training distance generation control enabling means responsive to termination by said training distance value determination enabling means for enabling said processing elements to, in parallel, generate a training distance value for storage in the training distance array in response to the training distance value in their respective training temporary stores, said training distance generation control enabling means further enabling said processing elements to, in parallel, update said training character array element identifier to iteratively enable it to identify each training character array element of said training character image array.

29. A character recognition system as defined in claim 28 further including training counter means for identifying, during each iteration, a training character array element from which the processing elements determine respective distance values in response to the training distance value determination enabling means.

30. A character recognition system as defined in claim 29 wherein said training character image array has a plurality of rows and columns, said training counter means including a training row counter which generates a training row counter value and a training column counter which generates a training column counter value, and said training character array element identifier including a training row pointer which generates a training row pointer value and a training column pointer which generates a training column pointer value, said training distance value determination enabling means enabling said processing elements to generate said training distance value in response to a row difference value between said training row counter value and said training row pointer value and a training column difference value between said training column counter value and said training column pointer value.

31. A character recognition system as defined in claim 29 in which:
A. each said training temporary store includes an on distance value store for storing an on distance value and an off distance value store for storing an off distance value;
B. said training distance value update generation enabling means for enabling said processing elements to, in parallel, selectively generate, in response to the on value or off value of their respective training character array element as identified by the row counter and the column counter, an on update distance value or an off update distance value in response to the distance value stored in a corresponding respective on distance value store or off distance value store, both said on distance value store and said off distance value store comprising parts of the training temporary store for the respective processing element, and the respective updated distance value for the iteration as determined by said processing elements in response to the distance value determination enabling means;
C. said training distance generation control enabling means enabling said processing elements to, in parallel, generate a respective training distance value and store said distance value in their respective training distance array, the training distance generation control enabling means enabling said processing elements to generate respective training distance values in response to the respective on distance values in the respective on distance value stores and the respective off distance values in the respective off distance value stores.

32. A character recognition system as defined in claim 31 in which each training distance array includes an on training distance array and an off training distance array,
A. said training distance generation control enabling means enabling said processing elements to generate respective on training distance values for storage in the respective on training distance arrays in response to the respective on distance values in the respective on distance value store and respective off training distance values for storage in the respective off training distance array in response to the respective off distance value in the respective off distance value store; and
B. said query/training artifact score determining enabling means enabling said processing elements to selectively use the on training distance values from the on training distance array and the off training distance values from the off training distance value array in generating said deviation score.

33. A character recognition system as defined in claim 32 in which:
A. said training distance generation control enabling means enables said processing elements to generate:
  (i) said on training distance array as a plurality of on training distance array elements, each associated with a training character array element, each processing element storing the on training distance value in the on training distance array element associated with the training character array element that is identified by the training counter means during each iteration; and
  (ii) said off training distance array as a plurality of off training distance array elements, each associated with a training character array element, each processing element storing the off training distance value in the off training distance array element associated with the training character array element that is identified by the training counter means during each iteration; and B. said query/training artifact score determining enabling means enables said processing elements to generate a respective deviation score for their respective training distance array as an aggregate of
  (i) an aggregate of on training distance values from those of said on training distance array elements associated with training character array elements having an on value and which correspond to the query character array elements which have an off value, and
  (ii) an aggregate of off training distance values from those of said off training distance array elements associated with training character array elements which have an off value and which correspond to the query character array elements which have an on value.

34. A character recognition system as defined in claim 32 in which:
  A. each training distance array element of each training distance array includes a training distance array element value store and an associated training value flag having an on condition and an off condition;
  B. said training distance generation control enabling means enables said processing elements, for each training distance array element, to
    (i) store the respective on value or off value as the respective training distance array element value in their respective training distance array element value store and
    (ii) establish the condition of the associated training value flag, both in response to the on value or off value of the training character array element identified by the training row counter and the training column counter; and
  C. said query/training artifact score determining enabling means enabling said processing elements to selectively use the training distance values from the respective distance value stores of said respective training distance array elements in response to the on or off value of the corresponding query character array elements of the query character image array.

35. A character recognition system as defined in claim 27 further comprising:
  A. query distance array generating means for generating a query distance array, said query character distance array having a pattern of query distance array elements corresponding to the pattern of the query character array elements, each query distance array element identifying a distance value from the corresponding query character array element to the query character array element having a selected on value or off value;
  B. said control means further including training/query artifact score generating enabling means for enabling said processing elements to use said deviation score generated during processing in response to said query/training artifact score determining enabling means, to generate for the respective training character image array an updated deviation score, the updated deviation score generated by each processing element further representing an aggregate of distance values from those of said query distance array elements which are associated with query character image elements which have an on value or an off value which differs from the on value or off value of a corresponding training character array element of the training character image array;
  C. said character identification means using said updated deviation score for identifying a character as the query character in response to said updated deviation scores as updated by said processing elements in response to said training/query artifact score generating means.

36. A character recognition system as defined in claim 35 further comprising:
  A. a query character array element identifier means for identifying a query character array element;
  B. said query distance array generating means comprising:
    i. a query temporary store for storing a query distance value;
    ii. a query character array element identifier for identifying a query character array element;
    iii query distance value determination means for iteratively determining a query distance value from each query character array element to the query character array element identified by the query character array element identifier;
    iv. query distance value update generation means for selectively generating an updated query distance value for storage in said query temporary store for each iteration of said query distance value determination means in response to the query distance value stored in said query temporary store, the updated query distance value being determined by the query distance value determination means and the on value or off value of said query character array element; and
    v. query distance generation control means responsive to termination by said query distance value determination means for generating a query distance value for storage in the query distance array in response to the query distance value in the query temporary store, said query distance generation control means further updating said query character array element identifier to iteratively enable it to identify each query character array element of said query character image array.

37. A character recognition system as defined in claim 36 further including query counter means for identifying, during each iteration, a query character array element from which it determines respective distance values.

38. A character recognition system as defined in claim 37 wherein said query character image array has a plurality of rows and columns, said query counter means including a query row counter which generates a query row counter value and a query column counter which generates a query column counter value, and said query character array element identifier including a query row pointer which generates a query row pointer value and a query column pointer which generates a query column pointer value, said query distance value determination means generating said query distance value in response to a row difference value between said query row counter value and said query row pointer value and a query column difference value between said query column counter value and said query column pointer value.

39. A character recognition system as defined in claim 37 in which:

A. said query temporary store includes an on distance value store for storing an on distance value and an off distance value store for storing an off distance value;

B. said distance value update generation means for generating, in response to the on value or off value of the query character array element as identified by the row counter and the column counter, an on update distance value or an off update distance value in response to the distance value stored in an corresponding respective on distance value store or off distance value store, both said on distance value store and said off distance value store comprising parts of the query temporary store, and the updated distance value for the iteration as determined by said distance value determination means;

C. said query distance generation control means generating a query distance value and storing said distance value in the respective query distance array, the query distance generation control means generating query distance values in response to the on distance values in the on distance value stores and the off distance values in the off distance value store.

40. A character recognition system as defined in claim 39 in which said query distance array includes an on query distance array and an off query distance array, A. said query distance generation control means generating on query distance values for storage in the on query distance array in response to the on distance value in the respective on distance value store and off query distance values for storage in the off query distance array in response to the off distance value in the off distance value store; and B. said training/query artifact score determining enabling means enabling said processing elements to selectively use the on query distance values from the on query distance array and the off query distance values from the off query distance value array in generating said deviation score.

41. A character recognition system as defined in claim 40 in which:

A. said query distance generation control means generates:
  (i) said on distance array as a plurality of on distance array elements, each associated with a query character array element, the query distance generation control means storing the on distance value in the on distance array element associated with the query character array element that is identified by the query counter means during each iteration; and
  (ii) said off distance array as a plurality of off distance array elements, each associated with a query character array element, the query distance generation control means storing the off distance value in the off distance array element associate with the query character array element that is identified by the query counter means during each iteration; and B. said training/query artifact score determining means generating the deviation score as an aggregate of
  (i) an aggregate of on query distance values from those of said on query distance array elements associated with query character array elements which have an on value and which correspond to the training character array elements which have an off value, and
  (ii) an aggregate of off query distance values from those of said off query distance array elements associated with query character array elements which have an off value and which correspond to the training character array elements which have an on value.

42. A character recognition system as defined in claim 39 in which:

A. each query distance array element of each query distance array includes a query distance array element value store and an associated query value flag having an on condition and an off condition;

B. said query distance generation control means for each query distance array element,
  (i) stores the on value or off value as the query distance array element value in query distance array element value store and
  (ii) establishes the condition of the associated query value flag, both in response to the on value or off value of the query character array element identified by the query row counter and the query column counter; and C. said training/query artifact score determining enabling means enabling said processing elements to selectively use the query distance values from the respective distance value stores of said respective query distance array elements in response to the on or off value of the corresponding training character array elements of the training character image array.

43. A character recognition system for generating a character identification value associated with a query character, the query character having a query character image array having a pattern of query character array elements each having an on value or an off value, using a plurality of training character image arrays, each associated with a character identification value, each training character image array having a pattern of training character array elements each having an on value or an off value, said system comprising A. a plurality of processing elements, each including a memory;

B. query distance array generating means generating a query distance array having a plurality of query distance array elements each associated with a query character array element of the associated query character image array, each query distance array element identifying a distance value from the corresponding query character array element to the query character array element having a selected on value or off value;

C. control means comprising:
  i. training character image array establishment enabling means for enabling said processing elements to establish, in parallel in their respective memories, a training character image array, each training character image array being associated with a character identification value, each training character image array having a pattern of training character array elements each having an on value or an off value;
  ii. training/query artifact score generating enabling means for enabling said processing elements to generate a deviation score representing an aggregate of distance values from those of said query distance array elements which are associated with query character image elements which have an on value or an off value which differs from the on value or off value of a corresponding training character array element of the training character image array; and C. character identification means for generating the character identification value for the query character in response to said deviation scores generated by said processing elements during processing in response to said training/query artifact score generating enabling means.

44. A character recognition system as defined in claim 43 further comprising:
A. a query character array element identifier means for identifying a query character array element;
B. said query distance array generating means comprising:
    i. query distance value determination means for iteratively determining a query distance value from each query character array element to the query character array element identified by the query character array element identifier;
    ii. query distance value update generation means for selectively generating for each iteration an updated query distance value for storage in respective query temporary stores in their respective memories in response to the query distance value, the updated query distance value being determined by the query distance value determination means and the on value or off value of said query character array element; and
    iii. query distance generation control means responsive to termination by said query distance value determination means for generating a query distance value for storage in the query distance array in response to the query distance value in the query temporary store, said query distance generation control means further updating said query character array element identifier to iteratively enable it to identify each query character array element of said query character image array.

45. A character recognition system as defined in claim 44 further including query counter means for identifying, during each iteration, a query character array element from which the distance values are determined by the query distance value determination means.

46. A character recognition system as defined in claim 45 wherein said query character image array has a plurality of rows and columns, said query counter means including a query row counter which generates a query row counter value and a query column counter which generates a query column counter value, and said query character array element identifier including a query row pointer which generates a query row pointer value and a query column pointer which generates a query column pointer value, said query distance value determination means generating said query distance value in response to a row difference value between said query row counter value and said query row pointer value and a query column difference value between said query column counter value and said query column pointer value.

47. A character recognition system as defined in claim 45 in which:
A. said query temporary store includes an on distance value store for storing an on distance value and an off distance value store for storing an off distance value;
B. said distance value update generation means for selectively generating, in response to the on value or off value of the query character array element identified by the row counter and the column counter, an on update distance value or an off update distance value in response to the distance value stored in the corresponding on distance value store or off distance value store, and the updated distance value for the iteration as determined by the distance value determination means;
C. said query distance generation control means generates a query distance value and stores said query distance value in the query distance array, the query distance generation control means generating query distance values in response to the on distance value in the on distance value store and the off distance value in the off distance value store.

48. A character recognition system as defined in claim 47 in which each query distance array includes an on query distance array and an off query distance array,
A. said query distance generation control means generating an on query distance value for storage in the on query distance array in response to the on distance value in the on distance value store and an off query distance value for storage in the off query distance array in response to the off distance value in the off distance value store; and
B. said training/query artifact score determining means selectively using the on query distance values from the on query distance array and the off query distance values from the off query distance value array in generating said deviation score.

49. A character recognition system as defined in claim 48 in which:
A. said on distance array comprises a plurality of on distance array elements, each associated with a query character array element, the query distance generation control means storing the on distance value in the on distance array element that is identified by the query counter means during each iteration;
B. said off distance array comprises a plurality of off distance array elements, each associated with a query character array element, the query distance generation control means storing the off distance value in the off distance array element that is identified by the query counter mans during each iteration; and
C. said training/query artifact score determining enabling means, in enabling said processing elements to generate respective a deviation score for their respective training distance array, generates the deviation score as an aggregate of
    (i) an aggregate of on query distance values from those of said on query distance array elements associated with query character array elements which have an on value and which correspond to the training character array elements which have an off value, and
    (ii) an aggregate of off query distance values from those of said off query distance array elements associated with query character array elements which have an off value and which correspond to the training character array elements which have an on value.

50. A character recognition system as defined in claim 47 in which:
- A. each query distance array element of each query distance array includes a query distance array element value store and an associated query value flag having an on condition and an off condition;
- B. said query distance generation control means, for each query distance array element,
  - (i) storing the respective on value or off value as the respective query distance array element value in the query distance array element value store and
  - (ii) establishing the condition of the associated query value flag, both in response to the on value or off value of the query character array element identified by the query row counter and the query column counter; and
- C. said training/query artifact score determining enabling means enabling said processing elements to selectively use the query distance values from said respective query distance array elements in response to the on or off value of the corresponding training character array elements of the training character image array.

51. A control arrangement for use in connection with a character recognition system for recognizing a character associated with a query character, the query character having a query character image defined by a query character image array having a pattern of array elements defining on pixels and off pixels for said query character image, the character recognition system including a plurality of processing elements, each including a memory, and generating a character identification value for the query character in response to deviation scores generated by said processing elements, said control arrangement comprising:
- A. training character image array establishment enabling means for enabling said processing elements to establish in parallel in their respective memories a training character image array, each training character image array being associated with a character identification value, each training character image array having a pattern of training character array elements each having an on value or an off value;
- B. training distance array generating enabling means for enabling said processing elements to generate, in parallel for each training character, a training distance array in their respective memories, each training distance array having a plurality of training distance array elements each associated with a training character array element of the associated training character image array, each training distance array element identifying a distance value from the corresponding training character array element to the training character array element having a selected on value or off value; and
- C. query/training artifact score determining enabling means for enabling said processing elements to generate, for their respective training distance array, a respective one of said deviation scores, each deviation score representing an aggregate of distance values from those of said training distance array elements which are associated with training character image elements which have an on value or an off value which differs from the on value or off value of a corresponding query character array element of said query character image array.

52. A control arrangement for use in connection with a character recognition system for recognizing a character associated with a query character, the query character having a query character image defined by a query character image array having a pattern of array elements defining on pixels and off pixels for said query character image, the character recognition system including a processor and generating a character identification value for the query character in response to deviation scores generated by said processor, said control arrangement comprising:
- A. training character image array establishment enabling means for enabling said processor to establish a training character image array for each of a plurality of training characters, each training character image array being associated with a character identification value, each training character image array having a pattern of training character array elements each having an on value or an off value;
- B. training distance array generating enabling means for enabling said processor to generate, in parallel for each training character, a training distance array, each training distance array having a plurality of training distance array elements each associated with a training character array element of the associated training character image array, each training distance array element identifying a distance value from the corresponding training character array element to the training character array element having a selected on value or off value; and
- C. query/training artifact score determining enabling means for enabling said processor to generate, for each training distance array, a respective one of said deviation scores, each deviation score representing an aggregate of distance values from those of said training distance array elements which are associated with training character image elements which have an on value or an off value which differs from the on value or off value of a corresponding query character array element of said query character image array.

53. A control arrangement for use in connection with a character recognition system for generating a character identification value associated with a query character, the query character having a query character image array having a pattern of query character array elements each having an on value or an off value, in response to:
- (i) a plurality of training character image arrays, each associated with a character identification value, each training character image array having a pattern of training character array elements each having an on value or an off value, and
- (ii) a query distance array having a plurality of query distance array elements each associated with a query character array element of the associated query character image array, each query distance array element identifying a distance value from the corresponding query character array element to the query character array element having a selected on value or off value; the character recognition system including a plurality of processing elements, each including a memory and generating a character identification value for the query character in response to deviation scores generated by said processing elements, said control arrangement comprising:

A. training character image array establishment enabling means for enabling said processing elements to establish, in parallel in their respective memories, a training character image array, each training character image array being associated with a character identification value, each training character image array having a pattern of training character array elements each having an on value or an off value; and B. training/query artifact score generating enabling means for enabling said processing elements to generate respective deviation scores representing an aggregate of distance values from those of said query distance array elements which are associated with query character image elements which have an on value or an off value which differs from the on value or off value of a corresponding training character array element of the training character image array.

54. A control arrangement for use in connection with a character recognition system for generating a character identification value associated with a query character, the query character having a query character image array having a pattern of query character array elements each having an on value or an off value, in response to:

(i) a plurality of training character image arrays, each associated with a character identification value, each training character image array having a pattern of training character array elements each having an on value or an off value, and (ii) a query distance array having a plurality of query distance array elements each associated with a query character array element of the associated query character image array, each query distance array element identifying a distance value from the corresponding query character array element to the query character array element having a selected on value or off value; the character recognition system including a processor and generating a character identification value for the query character in response to deviation scores generated by said processor, said control arrangement comprising:

A. training character image array establishment enabling means for enabling said processor to establish a training character image array, each training character image array being associated with a character identification value, each training character image array having a pattern of training character array elements each having an on value or an off value; and B. training/query artifact score generating enabling means for enabling said processor to generate respective deviation scores representing an aggregate of distance values from those of said query distance array elements which are associated with query character image elements which have an on value or an off value which differs from the on value or off value of a corresponding training character array element of the training character image array.

* * * * *